(12) United States Patent
Feng et al.

(10) Patent No.: US 11,768,856 B2
(45) Date of Patent: Sep. 26, 2023

(54) METHOD, APPARATUS, AND MANAGEMENT NODE FOR MANAGING DATA IN PARTITION TABLE, AND STORAGE MEDIUM

(71) Applicant: Huawei Cloud Computing Technologies Co., Ltd., Guizhou (CN)

(72) Inventors: Wei Feng, Beijing (CN); Fucheng Hong, Shenzhen (CN); Qi Sui, Beijing (CN)

(73) Assignee: HUAWEI CLOUD COMPUTING TECHNOLOGIES CO., LTD., Guizhou (CN)

( * ) Notice: Subject to any disclaimer, the term of this patent is extended or adjusted under 35 U.S.C. 154(b) by 0 days.

(21) Appl. No.: 17/589,318

(22) Filed: Jan. 31, 2022

(65) Prior Publication Data
US 2022/0156288 A1    May 19, 2022

Related U.S. Application Data

(63) Continuation of application No. PCT/CN2019/107747, filed on Sep. 25, 2019.

(51) Int. Cl.
*G06F 16/00* (2019.01)
*G06F 16/27* (2019.01)
(Continued)

(52) U.S. Cl.
CPC .......... *G06F 16/278* (2019.01); *G06F 16/182* (2019.01); *G06F 16/29* (2019.01)

(58) Field of Classification Search
CPC ...... G06F 16/278; G06F 16/29; G06F 16/182; G06F 3/0617; G06F 3/067; G06F 3/0685; G06F 3/0649
(Continued)

(56) References Cited

U.S. PATENT DOCUMENTS 9,619,169 B1    4/2017   Throop et al.
10,891,201 B1 *  1/2021   Kozlovsky .......... G06F 11/1469
(Continued)

FOREIGN PATENT DOCUMENTS

CN    102122303 A    7/2011
CN    106294671 A    1/2017
(Continued)

OTHER PUBLICATIONS

Jinwei Liu, et al., "A popularity-aware cost-effective replication scheme for high data durability in cloud storage," IEEE International Conference on Big Data (Big Data), Dec. 5, 2016, XP033056409, 6 pages.
(Continued)

*Primary Examiner* — Vincent F Boccio
(74) *Attorney, Agent, or Firm* — Conley Rose, P.C

(57) ABSTRACT

In a method for managing data in a partition table, a server, and a storage medium, a management node obtains a creation duration range of data of a target partition in the partition table, further obtains a geographical area to which the target partition belongs, historical access information of the target partition, or a service type of the target partition; and then, when the creation duration range of the data of the target partition meets a predetermined time range of a first storage stage and a preset condition is met, the management node alters the data that is of the target partition and that has been stored based on a storage policy corresponding to a second storage stage to be stored based on a storage policy corresponding to the first storage stage.

20 Claims, 15 Drawing Sheets

(51) Int. Cl.
    *G06F 16/182*     (2019.01)
    *G06F 16/29*     (2019.01)

(58) Field of Classification Search
    USPC .......................................................... 707/737
    See application file for complete search history.

(56) References Cited

U.S. PATENT DOCUMENTS

| | | |
|---|---|---|
| 11,422,726 B1 * | 8/2022 | Jo ........................... G06F 3/067 |
| 2012/0221521 A1 | 8/2012 | Chiu et al. |
| 2015/0095671 A1 | 4/2015 | Hu |
| 2019/0208011 A1 * | 7/2019 | Dutta ....................... G06F 3/061 |
| 2020/0082015 A1 * | 3/2020 | Watts .................. G06F 16/9024 |

FOREIGN PATENT DOCUMENTS

| | | |
|---|---|---|
| CN | 108776690 A | 11/2018 |
| CN | 109815219 A | 5/2019 |
| CN | 110096350 A | 8/2019 |

OTHER PUBLICATIONS

Lei Chang, et al., "HAWQ : a massively parallel processing SOL engine in hadoop," INFOCOMP 2012 : The Second International Conference on Advanced Communications and Computation, XP055474632, Oct. 21-26, 2012, 12 pages.

* cited by examiner

| Name of the partition key | Field type | Select the partition key | Type of the partition key | Unit of the partition key |
|---|---|---|---|---|
| Pt_d | string | ☐ | Creation time of data of a partition ▼ | Day ▼ |
| Pt_h | float | ☐ | Other ▼ | |
| Pt_n | int | ☐ | Creation time of data of a partition ▼ | Month ▼ |
| | | | | |

Setting related information of a partition key of a partition table

Save    Return

FIG. 3

| Management | Home page | Cluster | Host | Operation and maintenance | Audit | Tenant resource | System |
|---|---|---|---|---|---|---|---|
| Cluster | Data life cycle management | | | | | | |

Cluster property

Data life cycle management

Storage policy management

Setting a storage policy of data in a partition table

Data migration management

Data storage status monitoring

Parameter configuration

Setting a storage policy of data in a partition table

| Input a file name | | Search | | Select an existing policy and perform batch setting | | + Add a policy |
|---|---|---|---|---|---|---|
| File name | Creation time | Size | Select the partition table | Set a tiering property of the partition table | Use an existing storage policy template | Customize a new storage policy |
| Hot_data | 2019-03-02 | 107 B | ☐ | Set | Set | + Add a policy |
| Warm_data | 2019-03-04 | 87 B | ☐ | Set | Set | + Add a policy |
| Cold_data | 2019-03-04 | 187 B | ☐ | Set | Set | + Add a policy |

FIG. 4

Storage policy template of data in a partition table

Determining condition

| Condition relationship | Index item | Comparison logic | Index value | Operation |
|---|---|---|---|---|
|  | Minimum duration in a creation duration range of data of a partition | ≥ | 60 days |  |
| And | Last access time of the data of the partition | > | 20 days |  |
| Or |  |  |  |  |

Policy alteration

New storage policy [ ▶ ]   Replica policy [ ▶ ]

Timing policy [ 2019-04-01 24:00:00 ]

Multi-storage-stage list

| Stage sequence number | Storage policy | Predetermined time range | Storage alteration time | Storage alteration action | Operation |
|---|---|---|---|---|---|
| 1 | Hot data storage | Predetermined time range ... | Manual | Storage replica number = 2 | Edit Delete Operate |
| 2 | Warm data storage | Predetermined time range ... | Periodic | Storage replica number = 3 | Edit Delete Operate |

[ OK ]   Save and add the storage policy

FIG. 5

Managing a storage policy template of data in a partition table

| Storage policy template name | Stage number | Select the template | Description | Operation |
|---|---|---|---|---|
| Three-stage - Hot, warm, and cold storage | 3 | ☐ | Partition table A | View Edit Delete |
| Two-stage - Hot and cold storage | 2 | ☐ | Partition table B | View Edit Delete |

Save    Return

FIG. 6

METHOD, APPARATUS, AND MANAGEMENT NODE FOR MANAGING DATA IN PARTITION TABLE, AND STORAGE MEDIUM

CROSS-REFERENCE TO RELATED APPLICATIONS

This is a continuation of Int'l Patent. App. No. PCT/CN2019/107747 filed on Sep. 25, 2019, which is incorporated by reference.

FIELD

This disclosure relates to the field of big data technologies, and in particular, to a method, an apparatus, and a management node for managing data in a partition table, and a storage medium.

BACKGROUND

With rapid development of big data, cloud computing, and artificial intelligence, an enterprise has an exploded demand for data storage. As a result, the enterprise needs to store a large amount of data. For any enterprise, a longer storage duration of data indicates a lower value of the data. However, the data still occupies a large number of storage resources. Therefore, the data needs to be managed to reduce storage costs.

In a related technology, to reduce data storage costs, a data table may be divided into partition tables, and then a storage duration of data in the partition table is determined. If the storage duration of the data in the partition table exceeds a preset value, it is considered that the data in the partition table has expired, and the data in the partition table is deleted.

Because the data in the partition table is deleted after the storage duration of the data in the partition table exceeds a specific threshold, an upper-layer application subsequently cannot access the expired data.

SUMMARY

Embodiments provide a method, an apparatus, and a management node for managing data in a partition table, and a storage medium, to overcome a problem that an upper-layer application cannot access expired data in a related technology.

According to a first aspect, this disclosure provides a method for managing data in a partition table. The method may be performed by a management node, and the method includes: the management node obtains a creation duration range of data of a target partition in the partition table; obtains a geographical area to which the target partition belongs, historical access information of the target partition, or a service type of the target partition; and when the creation duration range of the data of the target partition meets a predetermined time range of a first storage stage and a preset condition is met, the management node alters the data that is of the target partition and that has been stored based on a storage policy corresponding to a second storage stage to be stored based on a storage policy corresponding to the first storage stage. Storage performance of the first storage stage is lower than storage performance of the second storage stage; and the preset condition includes one or a combination of the following three conditions: the geographical area to which the target partition belongs is a target area, the historical access information of the target partition meets a target condition, and the service type of the target partition is a target service type.

In the solution shown, the management node may manage any partition in the partition table. For any partition (which may be referred to as the target partition below), the management node may periodically obtain the creation duration range of the data of the target partition, and the management node may further obtain the geographical area to which the target partition belongs, the historical access information of the target partition, or the service type of the target partition.

Then, the management node may determine the second storage stage to which the data of the target partition currently belongs, and the management node obtains a predetermined time range of a next storage stage (which may be referred to as the first storage stage) adjacent to the second storage stage. The management node determines whether the creation duration range of the data of the target partition meets the predetermined time range, and the management node may further determine whether the preset condition is met. If the creation duration range of the data of the target partition meets the predetermined time range of the first storage stage and the preset condition is met, the management node may obtain the storage policy corresponding to the first storage stage. The management node alters the data that is of the target partition and that is stored by using the storage policy corresponding to the second storage stage to be stored by using the storage policy corresponding to the first storage stage. If the creation duration range of the data of the target partition does not meet the predetermined time range of the first storage stage, the management node does not process the data of the target partition. If the preset condition is not met, the management node does not process the data of the target partition.

In this way, when the data in the partition table meets a specific condition, the data in the partition table is stored based on a storage policy of a storage stage in which the data is located, without being deleted. Therefore, an upper-layer application can still access expired data. In addition, the management node may control the data of the partition to be stored in a storage resource that matches the data of the partition, so that data with relatively high data value is stored in a storage resource with relatively high performance, and data with relatively low data value is stored in a storage resource with relatively poor performance.

In a possible implementation of the first aspect, the historical access information of the target partition may include the last access time of the target partition and/or access frequency of the target partition within first duration closest to a current time point, and the first duration is a preset period of time, such as 14 days. The first duration is preset duration, such as 7 days. The target condition is that the access frequency is less than a first value and/or second duration is greater than a second value, and the second duration is duration from the last access time to the current time point.

In a possible implementation of the first aspect, that the management node stores the data of the target partition based on a storage policy corresponding to the first storage stage includes: when the second storage stage is a hot data storage stage and the first storage stage is a warm data storage stage, storing, in a storage area corresponding to the warm data storage stage, the data of the target partition based on a storage replica number corresponding to the warm data storage stage; or when the second storage stage is a warm data storage stage and the first storage stage is a cold data storage stage, storing, in a storage area corresponding to the cold data storage stage, the data of the target partition in an erasure coding (EC) format.

In the solution shown, when the second storage stage is the hot data storage stage and the first storage stage is the warm data storage stage, the management node may obtain the storage area and a storage manner that correspond to the warm data storage stage. The storage manner corresponding to the warm data storage stage is a replica manner. In this case, a storage policy corresponding to the warm data storage stage further includes the storage replica number. Then, the management node may store data, of the target partition, of the storage replica number in the storage area corresponding to the warm data storage stage.

When the second storage stage is the warm data storage stage and the first storage stage is the cold data storage stage, the management node may obtain the storage area and a storage manner that correspond to the cold data storage stage. The storage manner corresponding to the cold data storage stage is an EC format. Then, the management node may store, in the storage area corresponding to the cold data storage stage, the data of the target partition in the EC format. In this way, in the cold data storage stage, a storage resource can be saved because the EC format is used for storage.

In a possible implementation of the first aspect, the method further includes: establishing a mapping relationship between a Hadoop distributed file system HDFS directory of the target partition and a data block that is of the target partition and that is stored in a storage area corresponding to the first storage stage.

In the solution shown, during storage alteration on the data of the target partition, the management node may invoke an HDFS storage alteration tool to establish the mapping relationship between the HDFS directory and the data block in which the data of the target partition is stored. The management node may store the data of the target partition in the data block. In this way, because the HDFS directory of the target partition is directly moved, the storage alteration does not cause an alteration to a directory structure of the target partition in an HDFS. Therefore, an upper-layer application can read the data of the target partition by using an original path.

According to a second aspect, a method for managing data in a partition table is provided. The method may be performed by a management node, and the method includes: the management node may obtain a creation duration range of data of a target partition in the partition table; and when the creation duration range of the data of the target partition meets a predetermined time range of a first storage stage, alter the data that is of the target partition and that has been stored based on a storage policy corresponding to a second storage stage to be stored based on a storage policy corresponding to the first storage stage. Storage performance of the first storage stage is lower than storage performance of the second storage stage; and when the second storage stage is a hot data storage stage, the first storage stage is a warm data storage stage; or when the second storage stage is a warm data storage stage, the first storage stage is a cold data storage stage.

In the solution shown, the management node may manage any partition in the partition table. For any partition (which may be referred to as the target partition below), the management node may periodically obtain the creation duration range of the data of the target partition.

Then, the management node may determine the second storage stage to which the data of the target partition currently belongs, and then the management node obtains a predetermined time range of a next storage stage (which may be referred to as the first storage stage) adjacent to the second storage stage. The management node determines whether the creation duration range of the data of the target partition meets the predetermined time range. If the creation duration range of the data of the target partition meets the predetermined time range, the management node may obtain the storage policy corresponding to the first storage stage. The management node alters the data that is of the target partition and that is stored by using the storage policy corresponding to the second storage stage to be stored by using the storage policy corresponding to the first storage stage.

In this way, when the data meets a specific condition, the data is only stored based on a storage policy of a storage stage in which the data is located, without being deleted. Therefore, an upper-layer application can still access expired data. In addition, the management node may control the data of the partition to be stored in a storage resource that matches the data of the partition, so that data with relatively high data value is stored in a storage resource with relatively high performance, and data with relatively low data value is stored in a storage resource with relatively poor performance.

In a possible implementation of the second aspect, if minimum duration in a creation duration range of data is less than a first threshold in the hot data storage stage, minimum duration in a creation duration range of data is greater than or equal to the first threshold and the minimum duration is less than a second threshold in the warm data storage stage; or if minimum duration in a creation duration range of data is greater than or equal to the first threshold and the minimum duration is less than the second threshold in the warm data storage stage, minimum duration in a creation duration range of data is greater than or equal to the second threshold in the cold data storage stage.

The first threshold and the second threshold are preset values, and the first threshold is less than the second threshold. For example, the first threshold may be 3 days, and the second threshold may be 60 days.

According to a third aspect, this disclosure provides an apparatus for managing data in a partition table. The apparatus includes one or more modules, and the one or more modules are configured to implement the method for managing data in a partition table according to the first aspect or the possible implementations of the first aspect.

According to a fourth aspect, this disclosure provides an apparatus for managing data in a partition table. The apparatus includes one or more modules, and the one or more modules are configured to implement the method for managing data in a partition table according to the second aspect or the possible implementation of the second aspect.

According to a fifth aspect, this disclosure provides a management node for managing data in a partition table. The management node includes a processor and a memory. The memory stores computer instructions. The processor executes the computer instructions, to enable the management node to implement the method for managing data in a partition table according to the first aspect or the possible implementations of the first aspect, or enable the management node to implement the function of the apparatus for managing data in a partition table according to the third aspect.

According to a sixth aspect, this disclosure provides a management node for managing data in a partition table. The management node includes a processor and a memory. The memory stores computer instructions. The processor executes the computer instructions, to enable the management node to implement the method for managing data in a partition table according to the second aspect or the possible implementation of the second aspect, or enable the management node to implement the function of the apparatus for managing data in a partition table according to the fourth aspect.

According to a seventh aspect, this disclosure provides a computer-readable storage medium. The computer-readable storage medium stores computer instructions. The computer instructions instruct a management node to perform the method for managing data in a partition table according to the first aspect or the possible implementations of the first aspect, or the computer instructions instruct the management node to deploy the apparatus for managing data in a partition table according to the third aspect.

According to an eighth aspect, this disclosure provides a computer-readable storage medium. The computer-readable storage medium stores computer instructions. The computer instructions instruct a management node to perform the method for managing data in a partition table according to the second aspect or the possible implementation of the second aspect, or the computer instructions instruct the management node to deploy the apparatus for managing data in a partition table according to the fourth aspect.

According to a ninth aspect, this disclosure provides a computer program product that includes instructions. The computer instructions included in the computer program product instruct a management node to perform the method for managing data in a partition table according to the first aspect or the possible implementations of the first aspect, or the computer instructions included in the computer program product instruct the management node to deploy the apparatus for managing data in a partition table according to the third aspect.

According to a tenth aspect, this disclosure provides a computer program product that includes instructions. The computer instructions included in the computer program product instruct a management node to perform the method for managing data in a partition table according to the second aspect or the possible implementation of the second aspect, or the computer instructions included in the computer program product instruct the management node to deploy the apparatus for managing data in a partition table according to the fourth aspect.

The technical solutions provided include at least the following beneficial effects:

In the embodiments, the management node obtains the creation duration range of the data of the target partition in the partition table; the management node further obtains the geographical area to which the target partition belongs, the historical access information of the target partition, or the service type of the target partition; and then, when the creation duration range of the data of the target partition meets the predetermined time range of the first storage stage and the preset condition is met, the management node may alter the data that is of the target partition and that has been stored based on the storage policy corresponding to the second storage stage to be stored based on the storage policy corresponding to the first storage stage. The storage performance of the first storage stage is lower than the storage performance of the second storage stage. The preset condition includes one or a combination of the following three conditions: the geographical area to which the target partition belongs is the target area, the historical access information meets the target condition, and the service type of the target partition is the target service type. In this way, when the data in the partition table meets a specific condition, the data in the partition table is only stored based on a storage policy of a storage stage in which the data is located, without being deleted. Therefore, an upper-layer application can still access expired data. In addition, the management node may control the data of the partition to be stored in a storage resource that matches the data of the partition, so that data with relatively high data value is stored in a storage resource with relatively high performance, and data with relatively low data value is stored in a storage resource with relatively poor performance.

BRIEF DESCRIPTION OF THE DRAWINGS

FIG. 3 is a schematic diagram of an interface for setting related information of a partition key according to an embodiment.

FIG. 4 is a schematic diagram of an interface for setting a storage policy of data in a partition table according to an embodiment.

FIG. 5 is a schematic diagram of an interface for setting a storage policy template of data in a partition table according to an embodiment.

FIG. 6 is a schematic diagram of an interface for managing a storage policy template according to an embodiment.

DETAILED DESCRIPTION

To make the objectives, technical solutions, and advantages clearer, the following further describes the implementations in detail with reference to the accompanying drawings.

For ease of understanding the embodiments, the following first introduces a system architecture and concepts of terms used in the embodiments.

The embodiments are applied to a scenario of a partition table in big data, and the partition table may be a HIVE partition table. In the scenario of the partition table in big data, partitioning is performed based on a specified key value, and the key value may be referred to as a partition key. One partition table is divided into a plurality of partitions, and each partition is stored in a form of an HDFS directory.

The HIVE partition table is used as an example for description in the embodiments.

Figure 1:
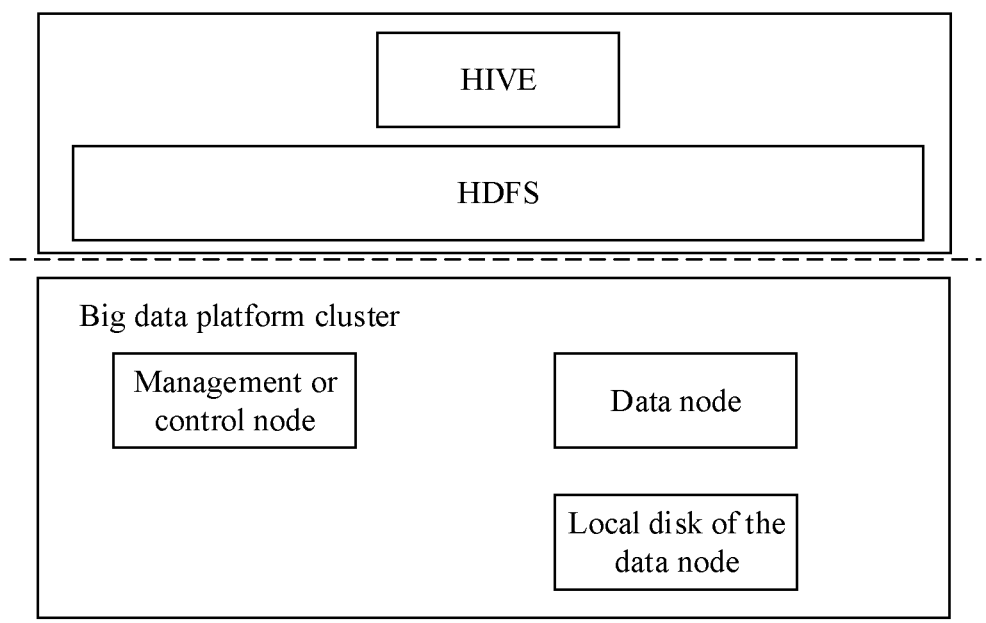
FIG. 1 is a schematic diagram of a structure of a Hadoop according to an embodiment.

HIVE is a data warehouse tool based on Hadoop. Hadoop is an open-source big data processing platform developed by the Apache Foundation, and includes a plurality of parts. An architecture of Hadoop is shown in FIG. 1. HDFS is Hadoop distributed file system (HDFS). A big data cluster includes two types of nodes. One type is a management node for management or control, and the other type is a data node for data storage. There may be a plurality of management nodes for management or control, and there may also be a plurality of data nodes for data storage. The management node may communicate with the data node, and each node (management node or data node) may be a server.

Figure 2:
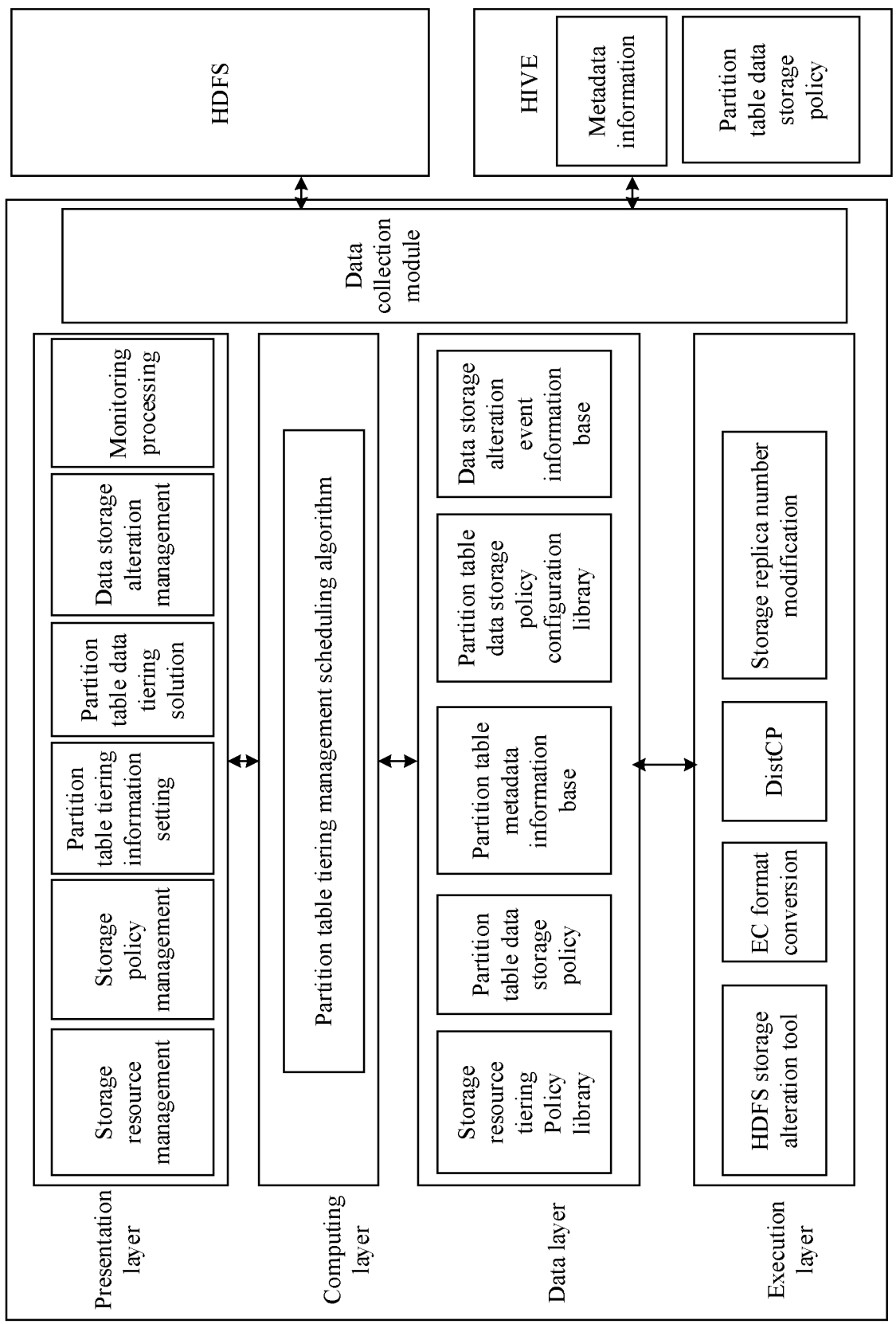
FIG. 2 is an architectural diagram of software for performing a method for managing data in a partition table according to an embodiment.

As shown in FIG. 2, an embodiment further provides an architectural diagram of software for performing a method for managing data in a partition table. The software may include a presentation layer, a computing layer, a data layer, an execution layer, and a data collection module. The plurality of layers and the data collection module are configured to interact with external components such as an HDFS and HIVE. In addition, HIVE may further present a structured query language (SQL) command line interaction interface. In this way, two interaction interfaces, including the presentation layer and the SQL command line interaction interface of HIVE, are presented to a user. The user may set a storage policy of data in a partition table and a related parameter of the partition table, such as related information of a partition key (which may also be referred to as a tiering parameter, and may include a type of the partition key, a unit of the partition key, and the like) or a storage medium of a storage resource, by using the two interfaces. Descriptions are provided below separately.

Presentation layer: The user queries information and configures the related parameter of the partition table by using a user interface (UI) of the presentation layer. The presentation layer may include the following functions:

(1) Storage resource management: The user (which may be an administrator, and any user below may be an administrator) defines a supported storage resource type, that is, specifies a storage medium type for the storage resource, for example, sets some hard disks to a solid-state disk (SSD) type, and sets other hard disks to a disk type.

(2) Storage policy management: The user defines a storage stage (for example, defines a number of storage stages, and the number of storage stages in this embodiment is greater than 2), a storage policy of each storage stage, and the like. The storage policy of each storage stage includes a storage resource type and a storage manner, and the storage manner is a storage replica number or an EC format. The user may further define a tiered-storage policy template of the partition table. The policy template includes a predetermined time range and a storage policy of each storage stage of the data.

(3) Partition table tiering management: The user sets tiering information of the data in the partition table, that is, sets the partition key of the partition table, and the like. For example, if the user chooses to establish a partition based on "day", a created partition directory is created based on day. Herein, "day" is used as an example, and specifically, a partition of another time interval may be alternatively supported.

(4) Data storage policy alteration management: The software presents a data storage alteration event, or the user may search for a storage alteration event by using the presentation layer. When data storage alteration fails, the software prompts the user for a failed storage alteration event by using the presentation layer. The user may manually intervene in a data storage alteration process by using the presentation layer, to perform an operation such as starting data storage alteration processing or stopping data storage alteration processing.

(5) Storage resource and data distribution monitoring: Storage occupation of the storage resource and distribution of specified data in different storage resources are presented to the user by using the presentation layer.

In addition, the presentation layer may be alternatively used by the user to set a storage policy of file data.

Computing layer: The computing layer traverses data of all partitions in each partition table; and based on a storage policy of data in each partition table, computes whether a storage alteration event occurs in data of a partition, a storage alteration manner (which may include manual storage alteration, automatic storage alteration, and the like) used when a storage alteration event occurs, and a storage alteration time point; and outputs the storage alteration event.

Data layer: The data layer stores the related storage policy, the tiering information of the partition table, and the like that are set by the user. The content may be stored in different formats at the data layer. For example, content stored in an xml file form includes a storage resource tiering policy (for example, storage resources are divided into two tiers: an SSD configured to store hot data; and a serial advanced technology attachment (SATA) configured to store warm data and cold data), and a predetermined time range and the storage policy of each storage stage of the partition table (for example, a storage stage is a hot data storage stage, a storage policy is SSD storage, and a storage replica number is 3). Content stored in a database form includes storage resource type information, a partition table data storage policy, a data storage alteration event information base, and a partition table metadata information base.

Execution layer: The execution layer obtains the data storage alteration event that is output by the computing layer, and invokes a related tool to perform data storage alteration. A specific implementation of the data storage alteration may include:

(1) invoking an HDFS storage alteration tool to perform same-cluster storage alteration on data of partitions;

(2) invoking distributed copy (DistCP) to perform cross-cluster storage alteration on data of partitions in, for example, a scenario in which storage resources in which data is located are distributed in different clusters before and after storage alteration, or a scenario in which computing and storage are separated;

(3) if an EC format is used, performing conversion of a multi-replica file to an EC-format file; and (4) modifying a storage replica number, that is, modifying a storage replica number of a multi-replica file, for example, three replicas are stored in an SSD, and two replicas are stored in an SATA.

HIVE SQL interaction interface: The user defines the related information of the partition key (such as the type of the partition key and the unit of the partition key) of the partition table by using a HIVE SQL. The user may further set the storage policy of the data in the partition table at the HIVE SQL interaction interface.

Data collection module: The data collection module collects metadata information and tiering information of a HIVE partition table. The metadata information may include creation time of a partition, historical access information of the partition (that is, the last access time of the partition, access frequency of the partition within first duration closest to a current time point), and the like. The first duration may be specified duration, such as 48 hours. The tiering information may include a type of a partition key, a unit of the partition key, a geographical area to which the partition belongs (which may also be referred to as a geographical area to which data in the partition belongs), a service type of the partition (which may also be referred to as a service type of data in the partition), and the like. It should be noted herein that the unit of the partition key correspondingly exists only when the type of the partition key is creation time of data. For example, the unit of the partition key is "one week".

In this embodiment, the tiering information of the data in the HIVE partition table, that is, related information of the partition key, may be set in a plurality of manners. The following provides two feasible manners:

Manner 1: defining the related information of the partition key of the partition table by using the HIVE SQL.

First, the user defines a name of the partition key, and defines whether calculation of a creation duration range of data obtained through partitioning based on the partition key is supported. In addition, the user defines the type of the partition key and the unit of the partition key. For example, as shown in Table 1, the user defines the related information of the partition key of the partition table, and the related information may be represented by using "ALTER TABLE test table SET TBLPROPERTIES ('TIER_PKEY_NAME'='pt_d',PART_TYP='DATA_AGE', DATA_AGE_UNIT='Day')". TBLPROPERTIES represents some properties of the partition table. TIER_PKEY_NAME is used to indicate the name of the partition key, and is assigned a value pt_d, to indicate/specify a partition key used for data tiering. PART_TYP is used to indicate the type of the partition key, and is assigned a value DATA_AGE. DATA_AGE_UNIT is used to indicate the unit of the partition key, and may be assigned a value HOUR, DAY, WEEK, MONTH, SEASON, YEAR, or the like. It should be noted that a time unit of the partition key needs to be specified only when the type of the partition key is the creation time of the data.

Manner 2: defining the related information of the partition key of the partition table by using the UI of the presentation layer.

In the UI, the user may enter a setting interface in the following manner: cluster->data management interface->interface of a storage policy of a HIVE partition table->related information of a partition key of the partition table. The process may be as follows: If related information of a partition key of a partition table needs to be defined, the user may input, to a search box, a keyword of the partition table that the user wants to query, to find the partition table. Then, the user selects "set" in setting the related information of the partition key of the partition table. In a table for setting the related information of the partition key of the partition table, the user selects the partition key, a type of the partition key, and a time unit of the partition key (the time unit exists only if the type of the partition key is creation time of data) to save the partition key, the type of the partition key, and the time unit of the partition key. The related information of the partition key is saved in tiering information after being saved, and an interface diagram is FIG. 3. In this way, the related information of the partition key is saved in the tiering information, and the related information of the partition key includes the type of the partition key, the unit of the partition key, and the like.

In this embodiment, a data tiering storage policy of a partition table may be set in a plurality of manners. The following provides two types of processing for setting the storage policy:

Manner 1: setting a storage policy of data in the partition table by using the presentation layer.

The user searches for the partition table by using a name of the partition table. Then, the user may select an existing storage policy template to set the storage policy of the data for the partition table, or the user may edit a new storage policy template to set a new storage policy for the partition table; and then, stores the storage policy of the data in the partition table.

To better understand a process of setting a storage policy template of data in this embodiment, this embodiment further provides an interface diagram. As shown in FIG. 4, an interface includes a search box, an option "select an existing policy and perform batch setting", "add a policy", and other options. If the user wants to select an existing policy and perform batch setting, the user may click the option "select an existing policy and perform batch setting" to trigger provision of all partition tables. The user may select, from all the partition tables, partition tables that the user wants to set in batches and then set the partition tables.

TABLE 1

| Parameter | Value | Note |
| --- | --- | --- |
| Tier_PKEY_NAME, specifying the name of the partition key | Tier_PKEY_NAME | Specify a partition key used for data tiering. |
| PART_TYPE, specifying the type of the partition key | DATA_AGE or other | Specify the type of the partition key. DATA_AGE specifies that the type of the partition key is the creation time of the data, and other specifies that other types of partition keys are used. |
| DATA_AGE_UNIT, specifying the creation time unit | HOUR, DAY, WEEK, MONTH, SEASON, or YEAR | If the type of the partition key is DATA_AGE, the time unit of the partition key should be specified. |
| . . . | . . . | . . . |

In addition, if the user wants to set a storage policy of a partition table, the user may find the partition table in a partition table list. A file name, creation time, a size (that is, a data amount), a selection option, "use an existing storage policy template", and "customize a storage policy" are correspondingly set for each partition table. If the user wants to use an existing storage policy template, the user may click a setting option corresponding to the existing storage policy template, so that the existing storage policy template can be set to an existing storage policy. If the user wants to customize a storage policy, the user may click an add option corresponding to "customize a storage policy", to trigger entering of an interface for adding a storage policy template.

As shown in FIG. 5, a setting table of a plurality of conditions for determining whether storage alteration can be performed on data in a partition is displayed in an interface for adding a storage policy template. The user may add, to the setting table, one or more determining conditions that the user wants to set. A using manner of the determining condition may be reflected in five aspects. A first aspect is "condition relationship", a second aspect is "index item", a third aspect is "comparison logic", a fourth aspect is "index value", and a fifth aspect is "operation". The condition relationship is used to reflect a relationship between a plurality of index items, such as "and" or "or". The index item is used to reflect a feature of the data of the partition, such as minimum duration in a creation duration range of the data of the partition, the last access time of the data of the partition, or access frequency of the data in the partition. The comparison logic is used to reflect a relationship with the index value. For example, if the index value is 60 days and the minimum duration in the creation duration range of the data of the partition is greater than or equal to 60 days, "greater than" is the comparison logic. The index value is used to distinguish between storage stages. In addition, if the setting table is relatively long, a slider bar (not shown in FIG. 5) is further set in the setting table, and all content of the determining condition may be viewed by using the slider bar.

In addition, options "new storage policy" (configuring a storage policy corresponding to a storage stage, such as one SSD or all SSDs) and "replica policy" are further set in the interface for adding a storage policy template. The user may click a drop-down option of "replica policy" to select a storage manner, such as a replica manner or an EC format. In addition, a timing policy is further displayed in the interface for adding a storage policy template. The timing policy is used to indicate a storage alteration time point, for example, is set to clock 24:00:00, that is, a system starts data storage alteration at clock 24:00:00.

In addition, a multi-storage-stage list is further displayed in the interface for adding a storage policy template, and the multi-storage-stage list is used to indicate a storage stage in which the data currently can be located. The multi-storage-stage list includes a stage sequence number, a storage policy, a predetermined time range, a storage alteration time point, a storage alteration action, an operation, and the like. For example, the storage stage sequence number is 1, the storage policy is hot data storage, the predetermined time range is that minimum duration in a data creation range is less than or equal to three days, the storage alteration time point is manual storage alteration, the storage alteration action is that a storage replica number is 2, and the operation may include editing, deleting, adding, or the like. The user may modify stage information corresponding to the operation by using "operation". After the modification, the storage stage sequence number is 2, the storage policy is warm data storage, the predetermined time range is that minimum duration in a data creation range is greater than or equal to three days and the minimum duration is less than 60 days, the storage alteration time point is periodic storage alteration, the storage alteration action is that a storage replica number is 3, and the operation may include editing, deleting, adding, or the like.

In addition, an option "OK" and an option "save and add the storage policy" are further displayed in the interface for adding a storage policy template. The user may click the option "OK" to add a newly-set predetermined time range to the storage stage list. If the user clicks the option "save and add the storage policy", the storage policy may be directly stored as a new storage policy.

In addition, this embodiment further provides a process for setting a storage policy template of a partition table: The user inputs a name of the partition table by using a "search box", to trigger searching for information of the partition table. Then, the user may click an option "select an existing policy and perform batch setting", to select an existing storage policy, and set storage policies of data in partition tables in batches. Alternatively, the user may click a button "add a policy" to re-edit a new storage policy, and then the user sets a storage policy of the partition table by using the new storage policy. Alternatively, the user may set a storage policy of a single partition table by using existing policy-> setting option. Alternatively, the user clicks an option "add a policy" corresponding to a single partition table, to edit a new storage policy for the single partition table, to set a storage policy of data in the partition table.

Manner 2: setting a storage policy of data in the partition table by using the HIVE SQL.

The user may specify a storage policy template of the partition table by using the HIVE SQL. The storage policy template includes a predetermined time range, a storage policy, a storage alteration time point, and the like of each storage stage. A statement may be ALTER TABLE test_table SET TBLPROPERTIES ('StoragePolicy_Template'= 'StoragePolicy_Template_3_Stage.xml'). Then, the user may set the set storage policy template to the storage policy of the data in the partition table.

In this way, related information of a partition key of the partition table and the storage policy of the data in the partition table are set by using the foregoing processing process.

In addition, as shown in FIG. 6, this embodiment further provides an interface for managing a storage policy template of data in a partition table. The management interface includes a name of each storage policy template, a number of storage stages in which the data is located in a storage policy, a description of the storage policy template, a template selection option, and an operation option for the storage policy template. For example, the management interface includes three storage policy templates. A name of a first storage policy template is three-stage (a hot data storage stage, a warm data storage stage, and a cold data storage stage), and a stage number in a storage policy is 3. This indicates that a hot, cold, and warm storage policy is provided for data in a partition table A, and an operation is viewing, editing, deleting, or the like. A name of a second storage policy template is two-stage (a hot data storage stage and a cold data storage stage), and a stage number in a storage policy is 2. A hot and cold storage policy is provided for data in a partition table B, and an operation is viewing, editing, deleting, or the like.

In addition, to better understand this embodiment, if partitioning is performed based on creation time of data, this embodiment further provides descriptions of related information of a partition key that is set for a partition table, a data storage policy, and a storage alteration time point, as shown in Table 2.

TABLE 2

| Category | Name | Value | Note |
| --- | --- | --- | --- |
| Related information of a partition key of a partition table | Pt_Property | TRUE or FALSE | Specify whether the partition table supports data tiering. |
| | Pt_Column | Column1_Name | Specify a column value based on which the partition is partitioned. |
| | Pt_key_type | Create_Time | Specify a type of the partition key, such as creation time of data. |
| | Pt_key_Unit | Hour, Day, Week, Month, Season, or Year | Specify an interval unit between partitions, including hour, day, week, month, season, or year based on which partitioning is performed. |
| | file_format | Pt_year_month_day | Define a relationship between a directory of the partition and the partition key. |
| Tiering storage policy of the partition table | Stage_Number | 1, 2, 3, 4, 5, or 6 | Define a number of included data tiers. For example, three data tiers that are hot storage, warm storage, and cold storage are included, that is, a hot data storage stage, a warm data storage stage, and a cold data storage stage are obtained through division. |
| | Partition_Type_Stage[i] | All_SSD, One_SSD, Hot, Warm, or Cold | Specify a type of the data tier. |
| | Data_Feature_Stage[i] | Age < 10, Age > 60, or 10 < Age < 60 | Specify a predetermined time range corresponding to each data tier. |
| | Storage_Type_Stage[i] | SSD, Disk, or Archive | Specify a storage medium of a storage resource corresponding to each data tier. |
| | Backup_Number_Stage[i] | 5, 4, 3, 2, or 1 | Specify a storage replica number in each data tier. |
| Storage alteration time point | Move_Time_Stage[i] | 00:15:00-1:00:00 (Hour:Min:Sec) Queue | Specify storage alteration time of data in the partition, and specify a time period; or perform scheduling in a task time sequence, and perform concurrent queue scheduling control. |

In addition, in all the foregoing descriptions, the creation time of the data is used as the partition key, and the partition table may be alternatively partitioned by using a plurality of standards. For example, partitioning is performed based on creation time "day" and "province", to create a two-layer partition directory. That is, a first-layer directory is obtained through data partitioning based on "day", and a second-layer directory is obtained through data partitioning based on "province". Alternatively, a first-layer directory is obtained through data partitioning based on "province", and a second-layer directory is obtained through data partitioning based on "day". For another example, partitioning is performed based on creation time "day" and "service type", to create a two-layer directory. That is, a first-layer directory is obtained through data partitioning based on "day", and a second-layer directory is obtained through data partitioning based on "service type". Alternatively, a first-layer directory is obtained through data partitioning based on "service type", and a second-layer directory is obtained through data partitioning based on "day". In addition, three partition keys may be alternatively used for partitioning. For example, partitioning is performed based on creation time "day", "province", and "service type", to create a three-layer partition directory. That is, a first-layer directory is obtained through data partitioning based on "day", a second-layer directory is obtained through data partitioning based on "province", and a third-layer directory is obtained through data partitioning based on "service type".

It should be noted that the service type may include a log data type and a fine data type.

HDFS of Hadoop: The HDFS is designed as a distributed file system suitable for running on commodity hardware.

SSD: Solid state electronic storage array disk.

SATA: The SATA is a serial hardware driver interface based on an industry standard, and is a hard disk interface specification jointly proposed by Intel, IBM, Dell, APT, Maxtor, and Seagate.

An embodiment provides a method for managing data in a partition table. The method may be performed by a management node in a large data cluster, and all or a part of the foregoing software is disposed in the management node. When all of the foregoing software is disposed in the management server, only a single management node can implement the method for managing data in a partition table. When a part of the foregoing software is disposed in the management node, a plurality of management nodes jointly implement the method for managing data in a partition table.

Figure 7:
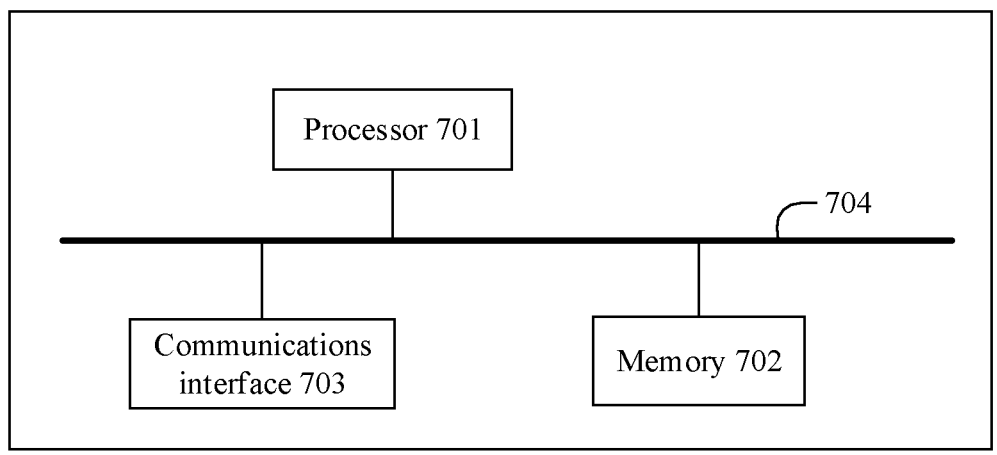
FIG. 7 is a schematic diagram of a structure of a management node according to an embodiment.

FIG. 7 provides an example possible architectural diagram of a management node. The management node may include a processor 701, a memory 702, a communications interface 703, and a bus 704. In the management node, there may be one or more processors 701. FIG. 7 shows only one of the processors 701. Optionally, the processor 701 may be a central processing unit (CPU). If the management node has a plurality of processors 701, the plurality of processors 701 may be of different types, or may be of a same type. Optionally, the plurality of processors of the management node may be integrated as a multi-core processor.

The memory 702 stores computer instructions and data, and the memory 702 may store computer instructions and data required for implementing the method for managing data in a partition table. For example, the memory 702 stores an instruction used to implement a step performed by an obtaining module in the method for managing data in a partition table. For another example, the memory 702 stores an instruction used to implement a step performed by a storage module in the method for managing data in a partition table. The memory 702 may be any one or any combination of the following storage media: a nonvolatile memory (for example, a read-only memory (ROM), an SSD, a HDD, or an optical disc) or a volatile memory.

The communications interface 703 may be any one or any combination of the following components with a network access function, such as a network interface (for example, an Ethernet interface) and a wireless network interface card.

The communications interface 703 is used by the management node to perform data communication with another management node or a terminal.

A thick line is used to represent the bus 704 in FIG. 7. The processor 701, the memory 702, and the communications interface 703 may be connected through the bus 704. In this way, the processor 701 may access the memory 702 by using the bus 704, and may further exchange data with the another management node or the terminal by using the communications interface 703.

The management node executes the computer instructions in the memory 702, to enable the management node to implement the method for managing data in a partition table, for example, enable the management node to perform the step performed by the obtaining module in the method for managing data in a partition table; and for another example, enable the management node to perform the step performed by the storage module in the method for managing data in a partition table.

An embodiment provides a method for managing data in a partition table. Three storage stages, that is, a hot data storage stage, a warm data storage stage, and a cold data storage stage, are used as an example for description in this embodiment. In the following, when a second storage stage is a hot data storage stage, a first storage stage is a warm data storage stage. In the following, when a second storage stage is a warm data storage stage, a first storage stage is a cold data storage stage.

If minimum duration in a creation duration range of data is less than a first threshold in the hot data storage stage, minimum duration in a creation duration range of data is greater than or equal to the first threshold and the minimum duration is less than a second threshold in the warm data storage stage. In this way, a predetermined time range of the hot data storage stage is that minimum duration in a creation duration range of data is less than the first threshold, a predetermined time range of the warm data storage stage is that minimum duration in a creation time range of data is greater than or equal to the first threshold and the minimum duration is less than the second threshold.

If minimum duration in a creation duration range of data is greater than or equal to the first threshold and the minimum duration is less than the second threshold in the warm data storage stage, minimum duration in a creation duration range of data is greater than or equal to the second threshold in the cold data storage stage. In this way, a predetermined time range of the warm data storage stage is that minimum duration in a creation time range of data is greater than or equal to the first threshold and the minimum duration is less than the second threshold, a predetermined time range of the cold data storage stage is that minimum duration in a creation duration range of data is greater than or equal to the second threshold.

The first threshold and the second threshold may be stored in a management node. For example, the first threshold is 3 days, and the second threshold is 60 days.

Figure 8:
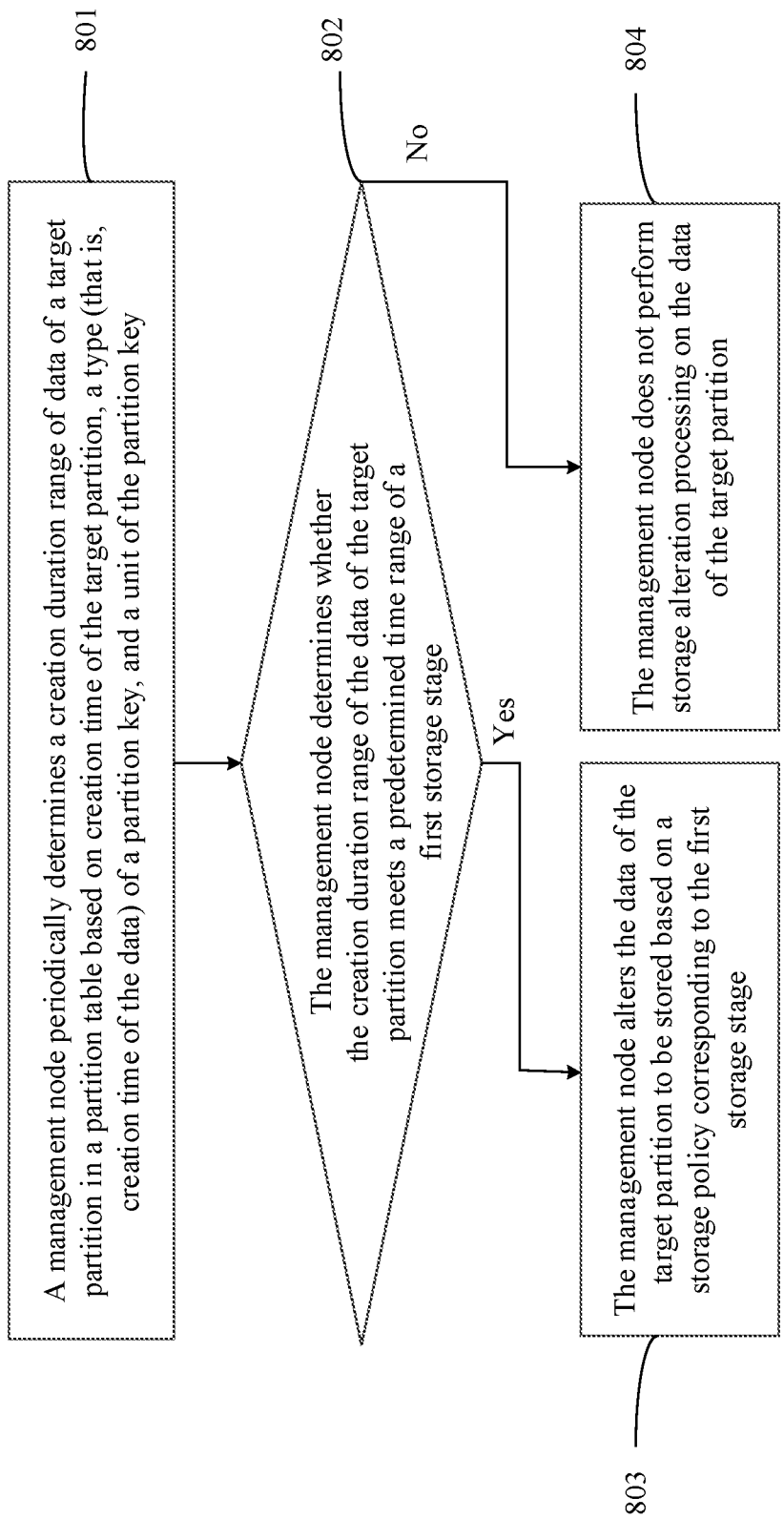
FIG. 8 is a schematic flowchart of a method for managing data in a partition table according to an embodiment.

An embodiment provides a method for managing data of a partition. In the method, a partition table may be partitioned based on creation time of data, that is, data that belongs to a same time period is combined into one partition. Metadata information may include creation time of the partition, and the like. Tiering information may include a type of a partition key (the type of the partition key is the creation time of the data), a unit of the partition key, and the like. When data in a partition table is managed, an execution process is shown in FIG. 8.

Step 801: A management node periodically determines a creation duration range of data of a target partition in the partition table based on creation time of the target partition, a type (that is, creation time of the data) of a partition key, and a unit of the partition key, where the target partition is any partition in the partition table.

A period may be preset. For example, the period may be "day". The type of the partition key is the creation time of the data, and the unit of the partition key is one time interval.

In this embodiment, after a HIVE table of an HDFS gets online, during each storage alteration event determining period, for a target partition, the management node may obtain creation time of the target partition in the partition table, a type of a partition key, and a unit of the partition key. Because the type of the partition key is creation time of data, the management node may use the creation time of the target partition as a start time point of data, and use the unit of the partition key as duration of the data of the target partition, to determine a cut-off time point of the data of the target partition. In this way, the management node can determine a creation time range of the data of the target partition. Then, the management node uses maximum time in the creation time range, to determine a distance between the maximum time and a current time point as minimum duration in a creation duration range of the data of the target partition. The management node may further use minimum time in the creation time range, to determine a distance between the minimum time and the current time point as maximum duration in the creation duration range of the data of the target partition. The management node combines the minimum duration and the maximum duration into a creation duration range, that is, the creation duration range of the data of the target partition.

For example, if the unit of the partition key is "one week" and the creation time of the target partition is 2019 Jul. 1, the creation time range of the data included in the target partition is 2019 Jul. 1 00:00:00 to 2019 Jul. 7 23:59:59. The maximum time is 2019 Jul. 7 23:59:59, and the minimum duration is eight days if the current time point is 2019 Jul. 15 23:59:59. The minimum time is 2019 Jul. 1 00:00:00, and the maximum duration is 14 days if the current time point is 2019 Jul. 15 23:59:59. Therefore, the management node can determine that the creation duration range of the data of the target partition is eight days to 14 days.

Step 801 is an optional step. For example, if the creation duration range of the data of the target partition in the partition table has been previously determined, step 801 may not be performed.

Step 802: When the data of the target partition is currently stored by using a storage policy corresponding to a second storage stage, the management node determines whether the creation duration range of the data of the target partition meets a predetermined time range of a first storage stage.

Figure 9:
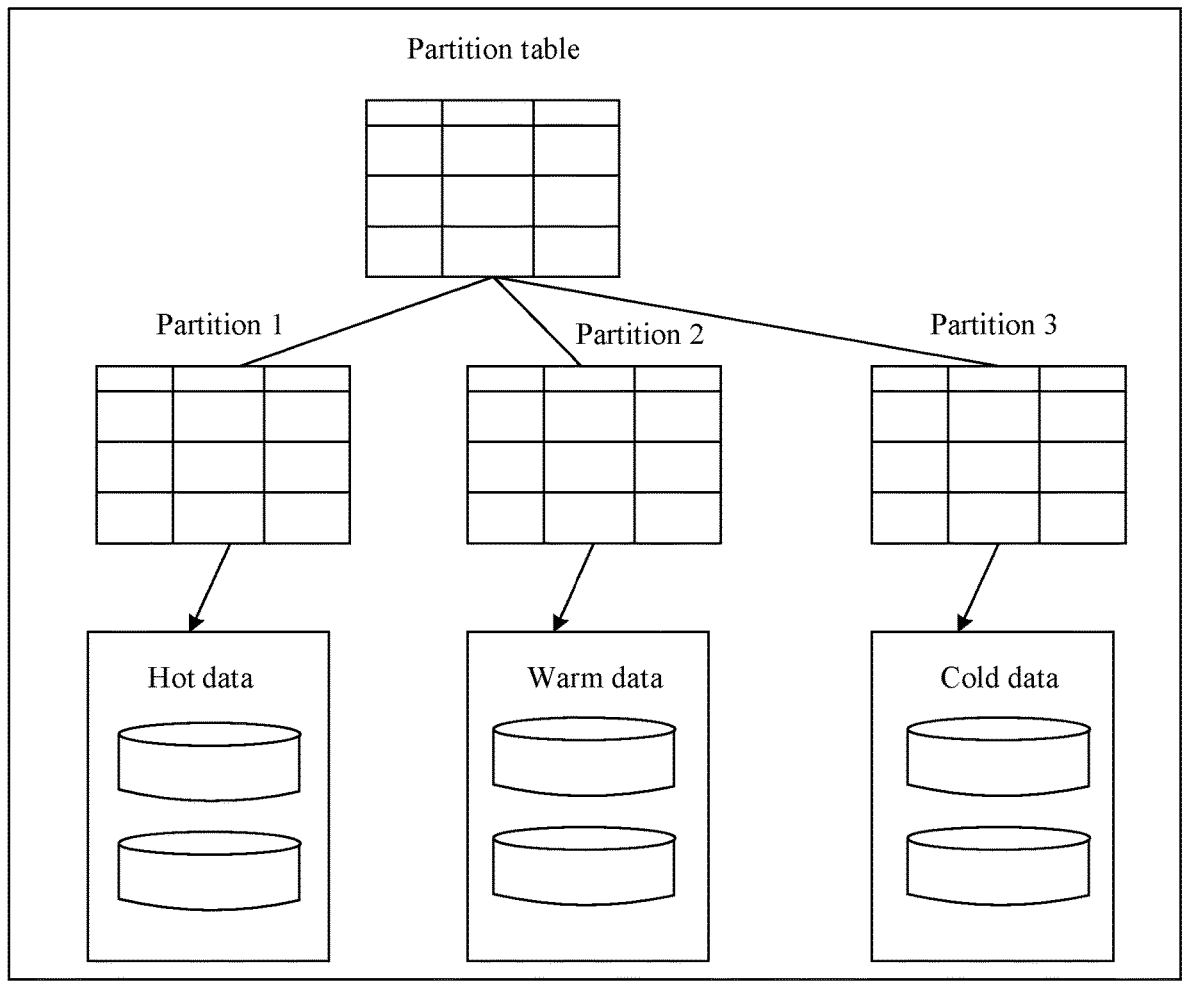
FIG. 9 is a schematic diagram of storage stages according to an embodiment.

In this embodiment, a storage policy of the data in the partition table includes three storage stages. For example, as shown in FIG. 9, the three storage stages are a hot data storage stage, a warm data storage stage, and a cold data storage stage. For example, for the hot data storage stage, a predetermined time range is that minimum duration in a creation duration range of data is less than three days. For the warm data storage stage, a predetermined time range is that minimum duration in a creation duration range of data is greater than or equal to three days and is less than 60 days. For a cold data storage stage, a predetermined time range is that minimum duration in a creation duration range of data is greater than or equal to 60 days.

A storage policy of the warm data storage stage may be as follows: A storage medium of a used storage resource may be an SATA, a storage manner is a replica manner (a storage replica number is 2), and a storage alteration time point is 24:00:00 per day. A storage policy of the hot data storage stage may be as follows: A storage medium of a used storage resource may be an SSD, a storage manner is a replica manner (a storage replica number is 3), and a storage alteration time point is 24:00:00 per day. A storage policy of the cold data storage stage may be as follows: A storage medium of a used storage resource may be an SATA, a storage manner is an EC format, and a storage alteration time point is 24:00:00 per day.

After determining the creation duration range of the data of the target partition, the management node may obtain the second storage stage to which the data of the target partition currently belongs, and the management node determines a predetermined time range of a next storage stage (that is, the first storage stage) of the second storage stage.

When a predetermined time range of the second storage stage is that minimum duration in a creation duration range of data is less than a first threshold, the management node determines a value relationship between minimum duration in the creation duration range of the data and the first threshold, and determines a value relationship between the minimum duration in the creation duration range and a second threshold. If the minimum duration in the creation duration range of the data of the target partition is greater than or equal to the first threshold and the minimum duration is less than the second threshold, the management node may determine that the creation duration range of the data of the target partition meets the predetermined time range of the first storage stage, that is, meets the predetermined time range of the warm data storage stage. If the minimum duration in the creation duration range of the data of the target partition is less than the first threshold, the management node may determine that the creation duration range of the data of the target partition does not meet the predetermined time range of the first storage stage, and the management node does not perform storage alteration processing on the data of the target partition.

When minimum duration in a creation duration range of data in the second storage stage is greater than or equal to the first threshold and the minimum duration is less than the second threshold, the management node determines a value relationship between minimum duration in the creation duration range and the second threshold. If the minimum duration is greater than or equal to the second threshold, the management node may determine that the creation duration range of the data of the target partition meets the predetermined time range of the first storage stage, that is, meets the predetermined time range of the cold data storage stage. If the minimum duration in the creation duration range of the data of the target partition is greater than or equal to the first threshold and the minimum duration is less than the second threshold, the management node may determine that the creation duration range of the data of the target partition does not meet the predetermined time range of the first storage stage, and the management node does not perform storage alteration processing on the data of the target partition.

Step 803: When the creation duration range of the data of the target partition meets the predetermined time range of the first storage stage, the management node alters the data that is of the target partition and that has been stored based on the storage policy corresponding to the second storage stage to be stored based on a storage policy corresponding to the first storage stage.

In this embodiment, if the creation duration range of the data of the target partition meets the predetermined time range of the first storage stage, the management node may determine to store the data of the target partition based on the storage policy corresponding to the first storage stage.

The management node may obtain the storage policy corresponding to the first storage stage. In the storage policy, the management node may obtain a storage resource type, a storage manner (the storage manner includes a replica manner or an EC format), and a storage alteration time point. The management node determines a storage resource corresponding to the storage resource type. Then, the management node determines a storage cluster to which the storage resource belongs, and may further determine a storage cluster to which a storage resource currently used for the data of the target partition belongs.

Then, the management node may determine whether the storage cluster to which the storage resource currently used for the data of the target partition belongs is the same as the storage cluster corresponding to the storage policy of the first storage stage, that is, the management node determines whether identifiers of the two storage clusters are the same. If the two identifiers are the same, the management node may determine that a storage area used after the storage alteration and a storage area used before the storage alteration are located in a same storage cluster. When the storage alteration time point reaches, the management node may invoke an HDFS mover tool to perform storage alteration on an HDFS directory of the target partition, to establish a mapping relationship between the HDFS directory and a data block in which the data of the target partition is stored. If the two identifiers are different, the management node may determine that a storage area used after the storage alteration and a storage area used before the storage alteration are located in different clusters. When the storage alteration time point reaches, the management node may invoke a DistCP tool to perform storage alteration on an HDFS directory of the target partition, to establish a mapping relationship between the HDFS directory and a data block in which the data of the target partition is stored.

It should be noted that, because the HDFS directory of the target partition is directly moved, the storage alteration does not cause an alteration of a directory structure of the target partition in the HDFS. Therefore, an upper-layer application can read the data of the target partition by using an original path.

It should be further noted that, when the first storage stage is the warm data storage stage, storage may be performed in the replica manner in the storage policy of the warm data storage stage. The performing storage in the replica manner indicates: assuming that the storage replica number is 2 and the storage resource is an SATA, storing two pieces of data of the target partition in the storage resource, where the two pieces of data of the target partition are stored in different SATAs of the storage resource. When the first storage stage is the cold data storage stage, storage may be performed in the EC format in the storage policy of the cold data storage stage. An EC-format storage process is: assuming that the data of the target partition may be divided into K data blocks and the K data blocks are associated together in a specific manner, generating M check blocks, where a data amount of the M check blocks is less than a data amount of the K data blocks, and only the M check blocks are stored. After some data blocks of the M check blocks are lost, the data of the target partition may be calculated by using a remaining check block. In this way, when the creation duration range of the data of the target partition meets the predetermined time range of the cold data storage stage, the data of the target partition is stored in the EC format, so that a relatively small amount of data needs to be stored, and then a relatively small number of storage resources are occupied.

It should be further noted that, the storage alteration time point may be obtained in a plurality of manners. The following provides three feasible manners.

Manner 1: During storage alteration processing, in order that the storage alteration does not affect normal service execution, the management node may determine a load amount of each time stage based on a historical load status. Specifically, the management node may divide time of one day into a plurality of equal parts to obtain a plurality of time stages, where all the time stages have same duration; and obtain a load amount of each time stage in the latest month. For any time stage, the management node adds load amounts of each day and then performs averaging, to obtain a load amount of the time period. In this way, the load amount of each time stage can be determined, and the management node can determine a start time point of a time period with a minimum load amount as the storage alteration time point of the data of the target partition.

Manner 2: During storage alteration processing, alternatively, a storage alteration time point that is set in a storage policy of each storage stage in the partition table may be obtained, and storage alteration may be performed on the data of the target partition based on the set storage alteration time point.

Manner 3: During storage alteration processing, alternatively, a user may be given a prompt that storage alteration can be performed on the data of the target partition, and the user may manually perform storage alteration, where a time point at which the user triggers the storage alteration is the storage alteration time point.

Step 804: If the creation duration range of the data of the target partition does not meet the predetermined time range of the first storage stage, the management node does not perform storage alteration processing on the data of the target partition.

In this embodiment, if the creation duration range of the data of the target partition does not meet the predetermined time range of the first storage stage, the management node does not perform storage alteration processing on the data of the target partition. For example, if the data of the target partition is currently stored by using the storage policy of the second storage stage, the management node determines that the creation duration range of the data of the target partition still meets the predetermined time range of the second storage stage, so that the management node can determine that the creation duration range of the data of the target partition does not meet the predetermined time range of the first storage stage, and the management node does not perform storage alteration processing on the data of the target partition.

In this way, through alteration of the data of the partition, the management node may store the data of the partition in a storage resource that matches the data of the partition, so that data with relatively high data value is stored in a storage resource with relatively high performance, and data with relatively low data value is stored in a storage resource with relatively poor performance. In addition, after altering the data from the storage resource in the hot data storage stage to the storage resource in the warm data storage stage, the management node alters the data from the storage resource in the warm data storage stage to the storage resource in the cold data storage stage, without performing data deleting processing. Subsequently, an upper-layer application can still access all the data. In addition, the data is not stored in the storage resource in the cold data storage stage at one time, but is retained in the storage resource in the warm data storage stage for a period of time. Because a read speed of the storage resource in the warm data storage stage is higher than a read speed of the storage resource in the cold data storage stage, a relatively high read speed can be maintained for a period of time. In addition, based on creation duration ranges of data of all partitions in the partition table, the management node may divide the data of all the partitions into different storage stages. Corresponding to different storage stages, the management node uses different storage policies for storage, so that the data in the partition table can be automatically managed.

In addition, data in one partition may be from different files. Therefore, in this embodiment, data on which storage alteration is performed may be data of different files.

Figure 10:
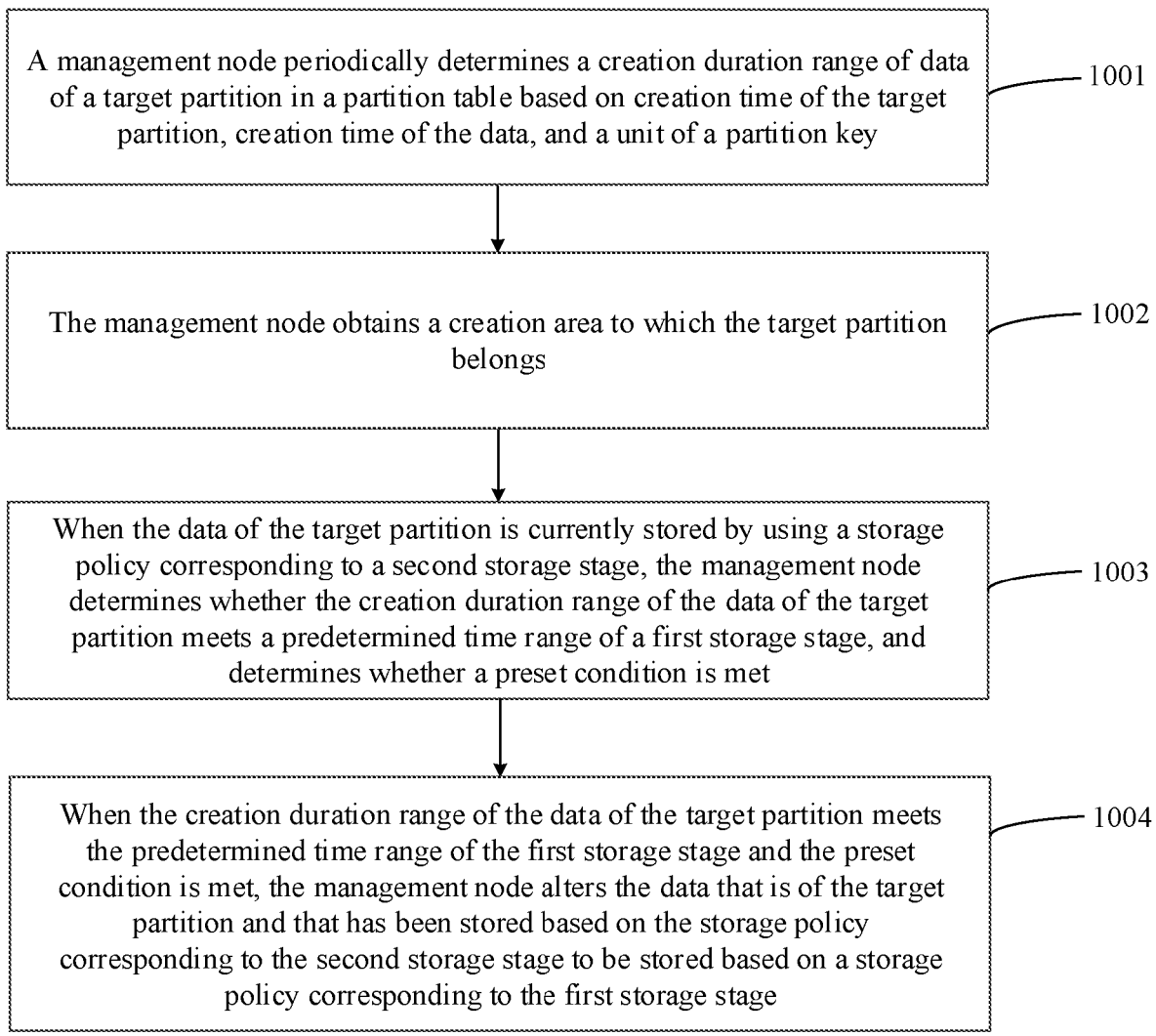
FIG. 10 is a schematic flowchart of a method for managing data in a partition table according to an embodiment.

An embodiment provides a method for managing data of a partition. In the method, a partition table may be partitioned based on creation time of data and geographical areas of the data, that is, a management node combines data that belongs to a same time period and a same geographical area into one partition. The geographical area may include one province, may include a plurality of cities in one province, or may include a plurality of provinces. Metadata information may include creation time of the partition, and the like. Tiering information may include a type of a partition key (the type of the partition key is the creation time of the data), a unit of the partition key, a geographical area to which the partition belongs, and the like. When the management node manages data in a partition table, an execution process is shown in FIG. 10.

Step 1001: The management node periodically determines a creation duration range of data of a target partition in the partition table based on creation time of the target partition, creation time of the data, and a unit of a partition key, where the target partition is any partition in the partition table.

Processing in step 1001 is completely the same as the processing in step 801. For details, refer to the processing in step 801. The details are not described herein again. Step 1001 is an optional step. For example, if the creation duration range of the data of the target partition in the partition table has been previously determined, step 1001 may not be performed.

Step 1002: The management node obtains a geographical area to which the target partition belongs.

In this embodiment, in addition to the creation time of the target partition, tiering information of the partition table further records the geographical area to which the target partition belongs. Therefore, the management node may further obtain, from the tiering information by using a name of the target partition, a geographical area corresponding to the name of the target partition. The management node determines the geographical area as the geographical area to which the target partition belongs.

Step 1003: When the data of the target partition is currently stored by using a storage policy corresponding to a second storage stage, the management node determines whether the creation duration range of the data of the target partition meets a predetermined time range of a first storage stage, and determines whether a preset condition is met.

In step 1003, the preset condition is that the geographical area to which the target partition belongs is a target area.

In this embodiment, in consideration that data in some areas is frequently viewed, the data in these areas is data on which storage alteration cannot be performed, and in consideration that data in some areas is not frequently viewed, the data in these areas is data on which storage alteration can be performed. The management node stores a geographical area to which the data on which storage alteration can be performed belongs. For example, a type of a partition key is a province, and geographical areas in which storage alteration can be performed may be a province A, a province B, and a province C, that is, target areas are the province A, the province B, and the province C.

Like the storage stages in FIG. 8, there are also three storage stages, completely the same as the storage stages in the process in FIG. 8. Details are not described herein again.

After determining the creation duration range of the data of the target partition, the management node may obtain the second storage stage to which the data of the target partition currently belongs, and determine a predetermined time range of a next storage stage (that is, the first storage stage) of the second storage stage.

When a predetermined time range of the second storage stage is that minimum duration in a creation duration range of data is less than a first threshold, the management node determines a value relationship between minimum duration in the creation duration range determined in step 1001 and the first threshold, and determines a value relationship between the minimum duration in the creation duration range and a second threshold, and the management node may further determine whether the preset condition is met. If the minimum duration in the creation duration range of the data of the target partition is greater than or equal to the first threshold and the minimum duration is less than the second threshold, the creation duration range of the data of the target partition meets the predetermined time range of the first storage stage, that is, meets a predetermined time range of a warm data storage stage. If the geographical area to which the target partition belongs is the target area, the preset condition is met. In addition, if the minimum duration in the creation duration range of the data of the target partition is less than the first threshold, the creation duration range of the data of the target partition does not meet the predetermined time range of the first storage stage. If the geographical area to which the target partition belongs is not the target area, the preset condition is not met.

When minimum duration in a creation duration range of data in the second storage stage is greater than or equal to the first threshold and the minimum duration is less than the second threshold, the management node determines a value relationship between minimum duration in the creation duration range and the second threshold, and the management node may further determine whether the preset condition is met. If the minimum duration is greater than or equal to the second threshold, the creation duration range of the data of the target partition meets the predetermined time range of the first storage stage, that is, meets a predetermined time range of a cold data storage stage. If the geographical area to which the target partition belongs is the target area, the preset condition is met. If the minimum duration in the creation duration range of the data of the target partition is greater than or equal to the first threshold and the minimum duration is less than the second threshold, the creation duration range of the data of the target partition does not meet the predetermined time range of the first storage stage. If the geographical area to which the target partition belongs is not the target area, the preset condition is not met.

Step 1004: When the creation duration range of the data of the target partition meets the predetermined time range of the first storage stage and the preset condition is met, the management node alters the data that is of the target partition and that has been stored based on the storage policy corresponding to the second storage stage to be stored based on a storage policy corresponding to the first storage stage.

Processing in step 1004 is completely the same as the processing in step 803. Details are not described herein again.

In this way, based on creation duration ranges of data of all partitions in the partition table and geographical areas to which the data of all the partitions belongs, the management node may divide the data of all the partitions into different storage stages, and corresponding to different storage stages, use different storage policies for storage. In this way, the management node can automatically manage the data in the partition table, and make data value match storage costs. That is, data with relatively high data value is stored in a storage resource with relatively high storage performance, and data with relatively low data value is stored in a storage resource with relatively low storage performance, thereby correspondingly reducing storage costs.

Figure 11:
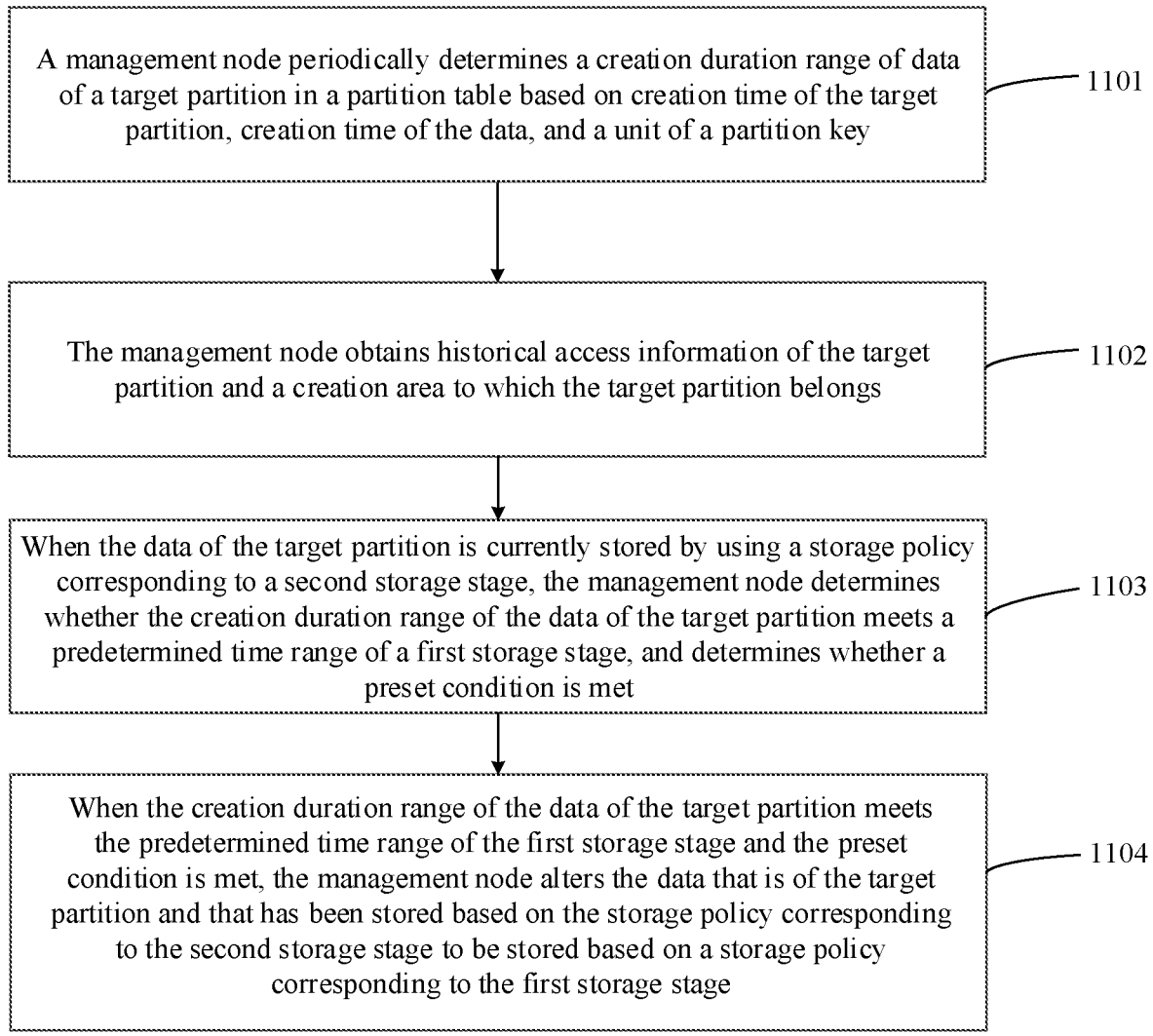
FIG. 11 is a schematic flowchart of a method for managing data in a partition table according to an embodiment.

An embodiment provides a method for managing data of a partition. In the method, a partition table may be partitioned based on creation time of data and geographical areas to which partitions belong, that is, data that belongs to a same time period and a same geographical area is combined into one partition. Tiering information may include a type of a partition key (the type of the partition key is the creation time of the data), a unit of the partition key, and the geographical areas to which the partitions belong. Metadata information may include creation time of the partition and historical access information of the partition. When a management node manages data in a partition table, an execution process is shown in FIG. 11.

Step 1101: The management node periodically determines a creation duration range of data of a target partition in the partition table based on creation time of the target partition, creation time of the data, and a unit of a partition key, where the target partition is any partition in the partition table.

Processing in step 1101 is completely the same as the processing in step 801. Details are not described herein again.

Step 1102: The management node obtains historical access information of the target partition and a geographical area to which the target partition belongs.

In this embodiment, for a manner of obtaining the geographical area to which the target partition belongs, refer to the processing in step 1002. Details are not described herein again. Metadata information may further include the historical access information of the partition. The management node may obtain, from the metadata information by using a name of the target partition, historical access information corresponding to the name. The historical access information may include the last access time of the target partition and/or access frequency of the target partition within first duration closest to a current time point (the first duration is a preset period of time, such as 10 days). The management node may determine duration from the current time point to the last access time, that is, second duration, by using the current time point and the last access time. For example, if the current time point is 2019 Jun. 1 11:00:00 and the last access time is 2019 Jun. 2 11:00:00, the duration from the current time point to the last access time is one day, that is, the second time period is one day. The first duration may be 10 days or the like.

Step 1103: When the data of the target partition is currently stored by using a storage policy corresponding to a second storage stage, the management node determines whether the creation duration range of the data of the target partition meets a predetermined time range of a first storage stage, and determines whether a preset condition is met.

The preset condition is that the geographical area to which the target partition belongs is a target area and the historical access information of the target partition meets a target condition. The target condition is that the access frequency within the first duration is less than a third threshold and/or the second duration is greater than a fourth threshold, and the second duration is the duration from the last access time to the current time point. Optionally, the third threshold may be a preset value, for example, the third threshold is preset to 10 times; and the fourth threshold may also be a preset value.

In this embodiment, the management node may determine a relationship between the access frequency within the first duration and the third threshold, and determine a relationship between the second duration from the current time point to the last access time and the fourth threshold. In a scenario, if the access frequency within the first duration is less than the third threshold and the second duration is greater than the fourth threshold, it may be determined that the historical access information of the target partition meets the target condition. In another scenario, if the access frequency within the first duration is less than the third threshold or the second duration is greater than the fourth threshold, it may be determined that the historical access information of the target partition meets the target condition.

After the management node determines the creation duration range of the data of the target partition, the management node may obtain the second storage stage to which the data of the target partition currently belongs, and determine a predetermined time range of a next storage stage (that is, the first storage stage) of the second storage stage. When a predetermined time range of the second storage stage is that minimum duration in a creation duration range of data is less than a first threshold, the management node determines a value relationship between minimum duration in the creation duration range and the first threshold, and determines a value relationship between the minimum duration in the creation duration range and a second threshold. The management node may further determine whether the historical access information of the data of the target partition meets the target condition (a determining manner is described at the beginning of step 1103), and the management node may further determine whether the geographical area to which the target partition belongs is the target area.

When the predetermined time range of the second storage stage is that minimum duration in a creation duration range of data is less than the first threshold, if the minimum duration in the creation duration range of the data of the target partition is greater than or equal to the first threshold and the minimum duration is less than the second threshold, it is determined that the creation duration range of the data of the target partition meets the predetermined time range of the first storage stage, that is, meets a predetermined time range of a warm data storage stage. When the historical access information of the data of the target partition meets the target condition and the geographical area to which the target partition belongs is the target area, the management node may determine that the preset condition is met.

When a predetermined time range of the second storage stage is that minimum duration in a creation duration range of data is greater than or equal to the first threshold and the minimum duration is less than the second threshold, the management node determines a value relationship between minimum duration in the creation duration range and the second threshold, the management node may further determine whether the historical access information of the data of the target partition meets the target condition, and the management node may further determine whether the geographical area to which the target partition belongs is the target area. If the minimum duration is greater than or equal to the second threshold, the creation duration range of the data of the target partition meets the predetermined time range of the first storage stage, that is, meets a predetermined time range of a cold data storage stage. When the historical access information of the data of the target partition meets the target condition and the geographical area to which the target partition belongs is the target area, it indicates that the preset condition is met.

In addition, when the predetermined time range of the second storage stage is that minimum duration in a creation duration range of data is less than the first threshold, if the minimum duration in the creation duration range of the data of the target partition is less than the first threshold or the preset condition is not met, the management node does not perform storage alteration processing on the data of the target partition. When the predetermined time range of the second storage stage is that minimum duration in a creation duration range of data is greater than or equal to the first threshold and the minimum duration is less than the second threshold, if the minimum duration in the creation duration range of the data of the target partition is greater than or equal to the first threshold and is less than the second threshold, or the preset condition is not met, the management node does not perform storage alteration processing on the data of the target partition.

Step 1104: When the creation duration range of the data of the target partition meets the predetermined time range of the first storage stage and the preset condition is met, the management node alters the data that is of the target partition and that has been stored based on the storage policy corresponding to the second storage stage to be stored based on a storage policy corresponding to the first storage stage.

Processing in step 1104 is completely the same as the processing in step 803. Details are not described herein again.

In this way, compared with the content shown in FIG. 10, the historical access information is further considered during storage alteration on the data of the partition. If the data of the target partition has been accessed recently at relatively high frequency or has been accessed recently, it may be considered that the data of the target partition is still possible to be frequently used. If storage alteration is performed on data that has been accessed recently at relatively high frequency or has been accessed recently, read performance is affected. Therefore, storage alteration may be performed only on data that is of a partition and that has been not accessed recently or accessed at relatively low frequency, and storage alteration may not be performed on data that is still possible to be frequently used recently, so that the data can be read at a relatively fast speed.

Figure 12:
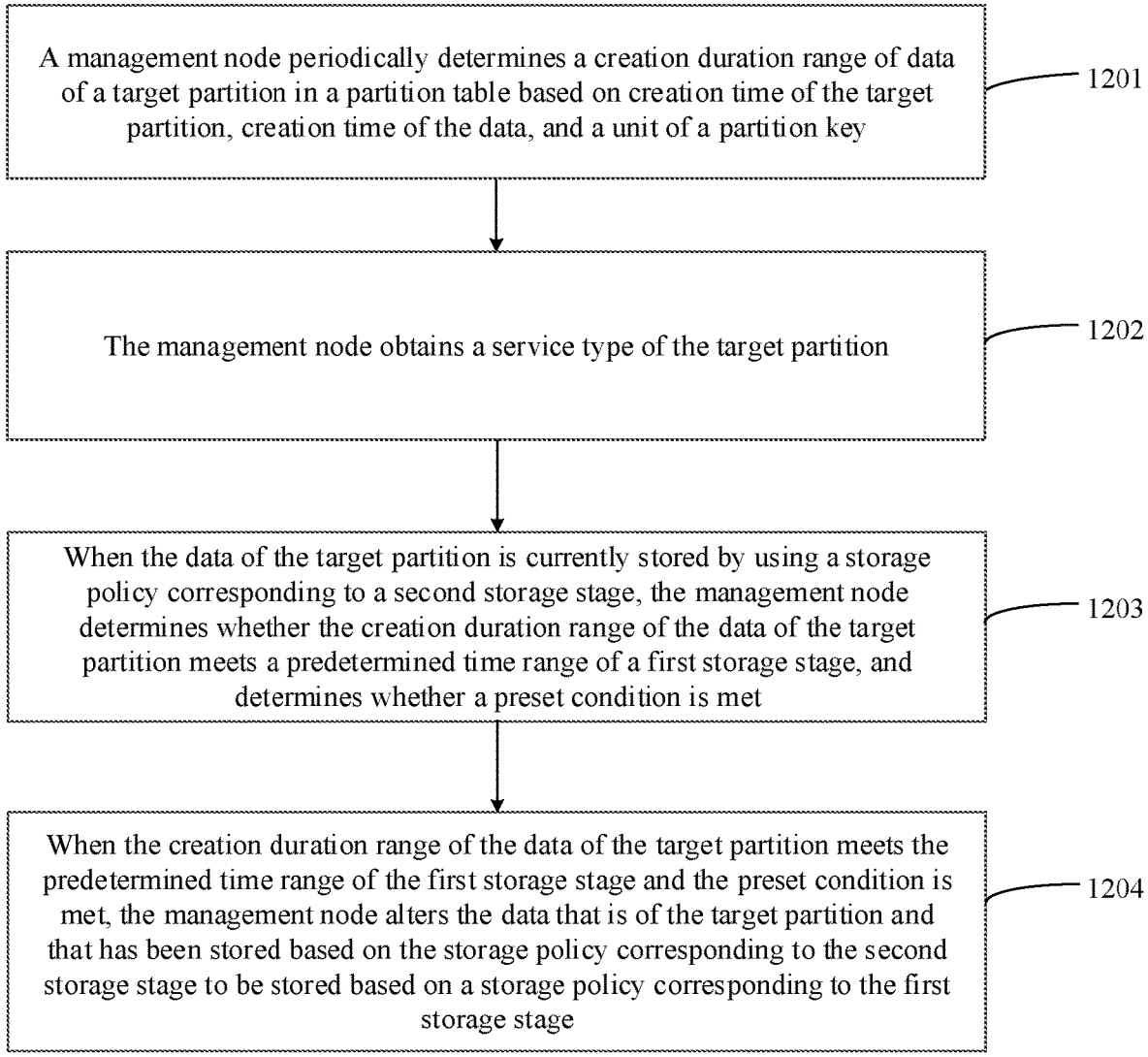
FIG. 12 is a schematic flowchart of a method for managing data in a partition table according to an embodiment.

An embodiment provides a method for managing data of a partition. In the method, a partition table may be partitioned based on creation time of data and service types of partitions, that is, data that belongs to a same time period and that is of a same service type is combined into one partition. Metadata information may include creation time of the partition, and the like. Tiering information may include a type of a partition key (the type of the partition key is the creation time of the data), a unit of the partition key, the service type of the partition, and the like. When a management node manages data in a partition table, an execution process is shown in FIG. 12.

Step 1201: The management node periodically determines a creation duration range of data of a target partition in the partition table based on creation time of the target partition, creation time of the data, and a unit of a partition key, where the target partition is any partition in the partition table.

Processing in step 1201 is completely the same as the processing in step 801. Details are not described herein again.

Step 1202: The management node obtains a service type of the target partition.

In this embodiment, tiering information records the service type of the target partition. Therefore, the management node can obtain, from the tiering information by using a name of the target partition, a service type corresponding to the name of the target partition. The management node determines the service type as the service type of the target partition.

Step 1203: When the data of the target partition is currently stored by using a storage policy corresponding to a second storage stage, the management node determines whether the creation duration range of the data of the target partition meets a predetermined time range of a first storage stage, and determines whether a preset condition is met.

In step 1203, the preset condition is that the service type of the target partition is a target service type.

In this embodiment, in consideration that data of some service types is frequently viewed, the data of these service types is data on which storage alteration cannot be performed, and in consideration that data of some service types is not frequently viewed, the data of these service types is data on which storage alteration can be performed. For example, service types of data may be classified into log data and fine data. The log data is not frequently accessed, and therefore storage alteration can be performed on the log data. The fine data is frequently accessed, and therefore storage alteration is not performed on the fine data. The management node stores a service type of the data on which storage alteration can be performed. For example, if the service type of the data on which storage alteration can be performed is log data, the service type that is of the data on which storage alteration can be performed and that is stored in the management node is log data, that is, the following target service type is log data.

Like the storage stages in FIG. 8, there are also three storage stages, completely the same as the storage stages in the process in FIG. 8. Details are not described herein again.

After determining the creation duration range of the data of the target partition, the management node may obtain the second storage stage to which the data of the target partition currently belongs, and determine a predetermined time range of a next storage stage (that is, the first storage stage) of the second storage stage.

When a predetermined time range of the second storage stage is that minimum duration in a creation duration range of data is less than a first threshold, the management node determines a value relationship between minimum duration in the creation duration range determined in step 1201 and the first threshold, and determines a value relationship between the minimum duration in the creation duration range and a second threshold, and the management node may further determine whether the preset condition is met. If the minimum duration in the creation duration range of the data of the target partition is greater than or equal to the first threshold and the minimum duration is less than the second threshold, the creation duration range of the data of the target partition meets the predetermined time range of the first storage stage, that is, meets a predetermined time range of a warm data storage stage. If the service type of the target partition is the target service type, the preset condition is met. If the minimum duration in the creation duration range of the data of the target partition is less than the first threshold, the creation duration range of the data of the target partition does not meet the predetermined time range of the first storage stage, and the management node does not perform storage alteration processing on the data of the target partition. If the service type of the target partition is not the target service type, the preset condition is not met, and the management node does not perform storage alteration processing on the data of the target partition.

When minimum duration in a creation duration range of data in the second storage stage is greater than or equal to the first threshold and the minimum duration is less than the second threshold, the management node determines a value relationship between minimum duration in the creation duration range and the second threshold, and the management node may further determine whether the preset condition is met. If the minimum duration is greater than or equal to the second threshold, the creation duration range of the data of the target partition meets the predetermined time range of the first storage stage, that is, meets a predetermined time range of a cold data storage stage. If the service type of the target partition is the target service type, the preset condition is met. If the minimum duration in the creation duration range of the data of the target partition is greater than or equal to the first threshold and the minimum duration is less than the second threshold, the creation duration range of the data of the target partition does not meet the predetermined time range of the first storage stage, and the management node does not perform storage alteration processing on the data of the target partition. If a geographical area to which the target partition belongs is not a target area, the preset condition is not met, and the management node does not perform storage alteration processing on the data of the target partition.

Step 1204: When the creation duration range of the data of the target partition meets the predetermined time range of the first storage stage and the preset condition is met, the management node alters the data that is of the target partition and that has been stored based on the storage policy corresponding to the second storage stage to be stored based on a storage policy corresponding to the first storage stage.

Processing in step 1204 is completely the same as the processing in step 803. Details are not described herein again.

In this way, during storage alteration on the data of the partition, creation duration of the data is considered, and further the service type of the data is considered. Data of different service types has different value. Data with low value is stored in a storage resource with relatively poor performance, and data with high value is stored in a storage resource with relatively good performance. Therefore, data value can match storage costs, and further when the data with the high value needs to be read, the data can be fast read.

Figure 13:
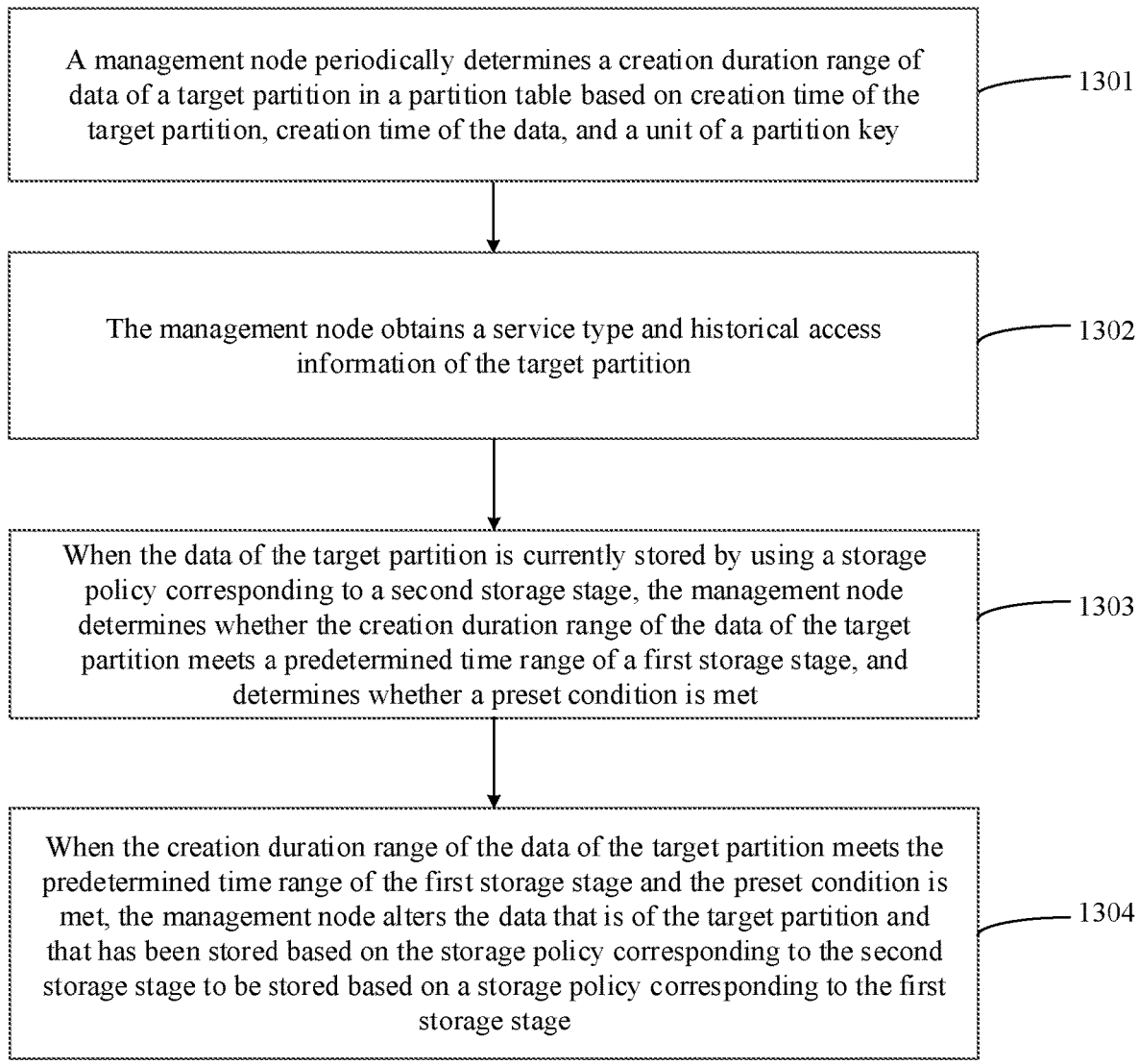
FIG. 13 is a schematic flowchart of another method for managing data in a partition table according to an embodiment.

An embodiment provides a method for managing data of a partition. In the method, a partition table may be partitioned based on creation time of data and service types of partitions, that is, data that belongs to a same time period and that is of a same service type is combined into one partition. Metadata information may include creation time of the partition, historical access information of the partition, and the like. Tiering information may include a type of a partition key (the type of the partition key is the creation time of the data), a unit of the partition key, and the service type of the partition. When a management node manages data in a partition table, an execution process is shown in FIG. 13.

Step 1301: The management node periodically determines a creation duration range of data of a target partition in the partition table based on creation time of the target partition, a type of a partition key, and a unit of the partition key, where the target partition is any partition in the partition table.

Processing in step 1301 is completely the same as the processing in step 801. Details are not described herein again.

Step 1302: The management node obtains a service type and historical access information of the target partition.

In this embodiment, tiering information records the service type of the target partition. Therefore, the management node can obtain, from the tiering information by using a name of the target partition, a service type corresponding to the name of the target partition. The management node determines the service type as the service type of the target partition. Metadata information may further include the historical access information of the partition. The management node may obtain, from the metadata information by using the name of the target partition, historical access information corresponding to the name. The historical access information may include the last access time of the target partition and access frequency of the target partition within first duration closest to a current time point. The management node may determine duration from the current time point to the last access time, that is, second duration, by using the current time point and the last access time.

Step 1303: When the data of the target partition is currently stored by using a storage policy corresponding to a second storage stage, the management node determines whether the creation duration range of the data of the target partition meets a predetermined time range of a first storage stage, and determines whether a preset condition is met.

The preset condition is that the service type of the target partition is a target service type and the historical access information of the target partition meets a target condition. The target condition is that the access frequency within the first duration is less than a third threshold and/or the second duration is greater than a fourth threshold, and the second duration is the duration from the last access time to the current time point. Optionally, the third threshold may be a preset value, for example, the third threshold is preset to 10 times; and the fourth threshold may also be a preset value.

In this embodiment, the management node may determine a relationship between the access frequency within the first duration and the third threshold, and determine a relationship between the second duration from the current time point to the last access time and the fourth threshold. In a scenario, if the access frequency within the first duration is less than the third threshold and the second duration is greater than the fourth threshold, it may be determined that the historical access information of the target partition meets the target condition. In another scenario, if the access frequency within the first duration is less than the third threshold or the second duration is greater than the fourth threshold, it may be determined that the historical access information of the target partition meets the target condition.

After the management node determines the creation duration range of the data of the target partition, the management node may obtain the second storage stage to which the data of the target partition currently belongs, and determine a predetermined time range of a next storage stage (that is, the first storage stage) of the second storage stage. When a predetermined time range of the second storage stage is that minimum duration in a creation duration range of data is less than a first threshold, the management node determines a value relationship between minimum duration in the creation duration range and the first threshold, and the management node may determine a value relationship between the minimum duration in the creation duration range and a second threshold. The management node may further determine whether the historical access information of the data of the target partition meets the target condition (a determining manner is described at the beginning of step 1303), and the management node may further determine whether the service type of the target partition is the target service type.

When the predetermined time range of the second storage stage is that minimum duration in a creation duration range of data is less than the first threshold, if the minimum duration in the creation duration range of the data of the target partition is greater than or equal to the first threshold and the minimum duration is less than the second threshold, the creation duration range of the data of the target partition meets the predetermined time range of the first storage stage, that is, meets a predetermined time range of a warm data storage stage. When the historical access information of the target partition meets the target condition and the service type of the target partition is the target service type, it indicates that the preset condition is met.

When a predetermined time range of the second storage stage is that minimum duration in a creation duration range of data is greater than or equal to the first threshold and the minimum duration is less than the second threshold, the management node determines a value relationship between minimum duration in the creation duration range and the second threshold, the management node may further determine whether the historical access information of the data of the target partition meets the target condition, and the management node may further determine whether the service type of the target partition is the target service type. If the minimum duration is greater than or equal to the second threshold, the creation duration range of the data of the target partition meets the predetermined time range of the first storage stage, that is, meets a predetermined time range of a cold data storage stage. When the historical access information of the target partition meets the target condition and the service type of the target partition is the target service type, the preset condition is met.

In addition, when the predetermined time range of the second storage stage is that minimum duration in a creation duration range of data is less than the first threshold, if the minimum duration in the creation duration range of the data of the target partition is less than the first threshold or the preset condition is not met, the management node does not perform storage alteration processing on the data of the target partition. When the predetermined time range of the second storage stage is that minimum duration in a creation duration range of data is greater than or equal to the first threshold and the minimum duration is less than the second threshold, if the minimum duration in the creation duration range of the data of the target partition is greater than or equal to the first threshold and the minimum duration is less than the second threshold, or the preset condition is not met, the management node does not perform storage alteration processing on the data of the target partition. That the preset condition is not met indicates that a condition 1 and/or a condition 2 are/is not met. The condition 1 is that the historical access information of the target partition meets the target condition, and the condition 2 is that the service type of the target partition is the target service type.

Step 1304: When the creation duration range of the data of the target partition meets the predetermined time range of the first storage stage and the preset condition is met, the management node alters the data that is of the target partition and that has been stored based on the storage policy corresponding to the second storage stage to be stored based on a storage policy corresponding to the first storage stage.

Processing in step 1304 is completely the same as the processing in step 803. Details are not described herein again.

In this way, during storage alteration on the data of the partition, creation duration of the data is considered, and further the service type of the data and the historical access information of the partition are considered. Therefore, data with high value can be more accurately distinguished from data with low value. Further, the data with the low value can be stored in a storage resource with relatively poor performance, and the data with the high value can be stored in a storage resource with relatively good performance. Therefore, data value can match storage costs, and further when the data with the high value needs to be read, the data can be fast read.

Figure 14:
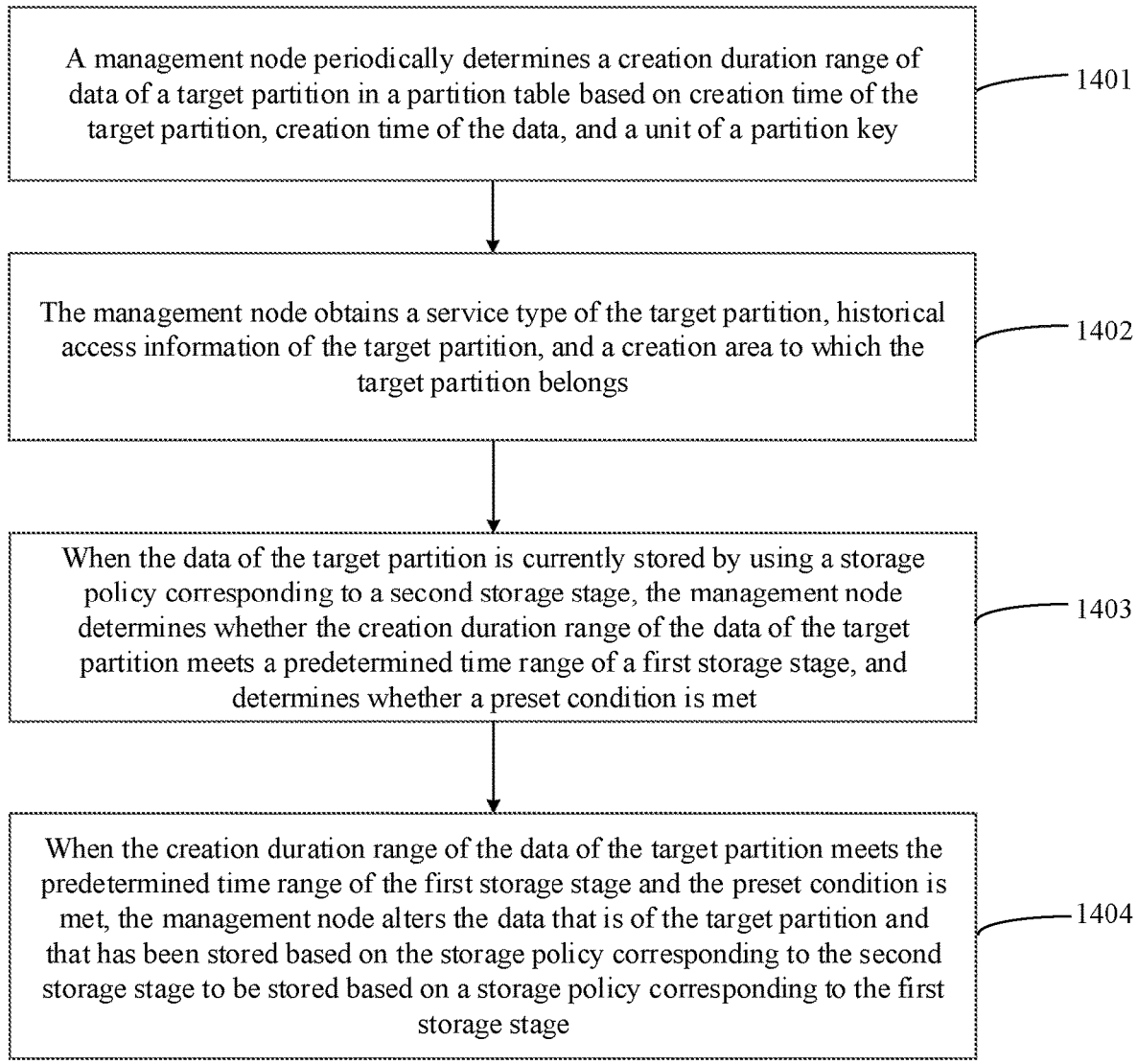
FIG. 14 is a schematic flowchart of a method for managing data in a partition table according to an embodiment.

An embodiment provides a method for managing data of a partition. In the method, a partition table may be partitioned based on creation time of data, geographical areas to which partitions belong, and service types of the partitions, that is, data that belongs to a same time period, that belongs to a same area, and that is of a same service type is combined into one partition. Metadata information may include creation time of the partition, and the like. Tiering information may include a type of a partition key (the type of the partition key is the creation time of the data), a unit of the partition key, the geographical area to which the partition belongs, and the service type of the partition. When a management node manages data in a partition table, an execution process is shown in FIG. 14.

Step 1401: The management node periodically determines a creation duration range of data of a target partition in the partition table based on creation time of the target partition, creation time of the data, and a unit of a partition key, where the target partition is any partition in the partition table.

Processing in step 1401 is completely the same as the processing in step 801. Details are not described herein again.

Step 1402: The management node obtains a service type of the target partition, historical access information of the target partition, and a geographical area to which the target partition belongs.

In this embodiment, for a manner of obtaining the service type of the target partition, refer to the manner in FIG. 12, and for obtaining the historical access information of the target partition and the geographical area to which the target partition belongs, refer to the manner in FIG. 11. Details are not described herein again.

Step 1403: When the data of the target partition is currently stored by using a storage policy corresponding to a second storage stage, the management node determines whether the creation duration range of the data of the target partition meets a predetermined time range of a first storage stage, and determines whether a preset condition is met.

The preset condition is that the service type of the target partition is a target service type, the historical access information of the target partition meets a target condition, and the geographical area to which the target partition belongs is a target area. The target condition has been described above, and details are not described herein again.

In this embodiment, after the management node determines the creation duration range of the data of the target partition, the management node may obtain the second storage stage to which the data of the target partition currently belongs, and determine a predetermined time range of a next storage stage (that is, the first storage stage) of the second storage stage. When a predetermined time range of the second storage stage is that minimum duration in a creation duration range of data is less than a first threshold, the management node determines a value relationship between minimum duration in the creation duration range and the first threshold, and determines a value relationship between the minimum duration in the creation duration range and a second threshold, the management node may further determine whether the historical access information of the data of the target partition meets the target condition, the management node may further determine whether the service type of the target partition is the target service type, and the management node may further determine whether the geographical area to which the target partition belongs is the target area.

When the predetermined time range of the second storage stage is that minimum duration in a creation duration range of data is less than the first threshold, if the minimum duration in the creation duration range of the data of the target partition is greater than or equal to the first threshold and the minimum duration is less than the second threshold, the creation duration range of the data of the target partition meets the predetermined time range of the first storage stage, that is, meets a predetermined time range of a warm data storage stage. When the historical access information of the target partition meets the target condition, the service type of the target partition is the target service type, and the geographical area to which the target partition belongs is the target area, it indicates that the preset condition is met.

When a predetermined time range of the second storage stage is that minimum duration in a creation duration range of data is greater than or equal to the first threshold and the minimum duration is less than the second threshold, the management node determines a value relationship between minimum duration in the creation duration range and the second threshold, the management node may further determine whether the historical access information of the data of the target partition meets the target condition, and the management node may further determine whether the service type of the target partition is the target service type. If the minimum duration is greater than or equal to the second threshold, the creation duration range of the data of the target partition meets the predetermined time range of the first storage stage. When the historical access information of the target partition meets the target condition, the service type of the target partition is the target service type, and the geographical area to which the target partition belongs is the target area, it indicates that the preset condition is met.

In addition, when the predetermined time range of the second storage stage is that minimum duration in a creation duration range of data is less than the first threshold, if the minimum duration in the creation duration range of the data of the target partition is less than the first threshold or the preset condition is not met, the management node does not perform storage alteration processing on the data of the target partition. When the predetermined time range of the second storage stage is that minimum duration in a creation duration range of data is greater than or equal to the first threshold and the minimum duration is less than the second threshold, if the minimum duration in the creation duration range of the data of the target partition is greater than or equal to the first threshold and the minimum duration is less than the second threshold, or the preset condition is not met, the management node does not perform storage alteration processing on the data of the target partition. That the preset condition is not met indicates that one or more of a condition 1, a condition 2, and a condition 3 are not met. The condition 1 is that the geographical area to which the target partition belongs is the target area, the condition 2 is that the historical access information of the target partition meets the target condition, and the condition 3 is that the service type of the target partition is the target service type.

Step 1404: When the creation duration range of the data of the target partition meets the predetermined time range of the first storage stage and the preset condition is met, the management node alters the data that is of the target partition and that has been stored based on the storage policy corresponding to the second storage stage to be stored based on a storage policy corresponding to the first storage stage.

Processing in step 1404 is completely the same as the processing in step 803. Details are not described herein again.

In this way, during storage alteration on the data of the partition, creation duration of the data is considered, and further the service type of the partition, the historical access information of the partition, and the geographical area to which the partition belongs are considered. Therefore, data with high value can be more accurately distinguished from data with low value. Further, the data with the low value can be stored in a storage resource with relatively poor performance, and the data with the high value can be stored in a storage resource with relatively good performance. Therefore, data value can match storage costs, and further when the data with the high value needs to be read, the data can be fast read.

It should be noted that in the process in FIG. 14, the preset condition is that the geographical area to which the target partition belongs is the target area, the historical access information of the target partition meets the target condition, and the service type of the target partition is the target service type. In addition, the preset condition may be alternatively that the historical access information of the target partition meets the target condition. In addition, the preset condition may be alternatively that the geographical area to which the target partition belongs is the target area and the service type of the target partition is the target service type. Specific processing is basically the same as that in the foregoing process. For details, refer to the foregoing description. The details are not described herein again.

In a possible implementation, during partitioning, a partition table is partitioned based on creation time of data. The management node partitions data of a same account within a period of time. Metadata information may include creation time of a partition, and the like. Tiering information includes a type of a partition key (the type of the partition key is the creation time of the data), a unit of the partition key, and an account level of an account to which data of the partition belongs. An account level corresponding to a first value is higher than an account level corresponding to a second value.

When managing the data in the partition table, the management node may determine a creation duration range of data of a target partition. When a predetermined time range of a second storage stage is that minimum duration in a creation duration range of data is less than a first threshold, if minimum duration in the creation duration range of the data of the target partition is greater than or equal to the first threshold and the minimum duration is less than a second threshold, it may be determined that the creation duration range of the data of the target partition meets a predetermined time range of a first storage stage (in this case, the second storage stage is a hot data storage stage, and the first storage stage is a cold data storage stage). When an account level of an account to which the data of the target partition belongs is lower than the first value and higher than the second value, the management node may determine that a preset condition is met. The management node determines that storage alteration processing can be performed on the data.

When a predetermined time range of a second storage stage is that minimum duration in a creation duration range of data is greater than or equal to the first threshold and the minimum duration is less than the second threshold, if minimum duration in the creation duration range of the data of the target partition is greater than or equal to the second threshold, it may be determined that the creation duration range of the data of the target partition meets a predetermined time range of a first storage stage (in this case, the second storage stage is a warm data storage stage, and the first storage stage is a cold data storage stage). When an account level of an account to which the data of the target partition belongs is lower than the second value, it may be determined that a preset condition is met. The management node determines that storage alteration processing can be performed on the data.

In addition, when a predetermined time range of a second storage stage is that minimum duration in a creation duration range of data is less than a first threshold, if maximum creation duration in the creation duration range of the data of the target partition is less than the first threshold, the management node may determine that a predetermined time range of the data of the target partition does not meet a predetermined time range condition of a first storage stage (a warm data storage stage). When an account level of an account to which the data of the target partition belongs is higher than or equal to the first value, it indicates that the preset condition is not met.

When a predetermined time range condition of a second storage stage is that minimum duration in a creation duration range of data is greater than or equal to the first threshold and the minimum duration is less than the second threshold, if minimum duration in the creation duration range of the data of the target partition is less than the second threshold, the management node may determine that a predetermined time range of the data of the target partition does not meet a predetermined time range condition of a first storage stage (a cold data storage stage). When an account level of an account to which the data of the target partition belongs is higher than the second value, it indicates that the preset condition is not met.

In addition, the metadata information may further include a geographical area to which the target partition belongs. Data that is of a same account within a period of time and that belongs to one area is partitioned. When the management node determines that the preset condition is met, the following condition should be further met: The geographical area to which the target partition belongs is a target area.

In addition, the tiering information may further include a service type of the target partition. Data that is of a same account within a period of time and that is of one type is partitioned. Similarly, when the management node determines that the preset condition is met, the following condition should be further met: The service type of the target partition is a target service type.

In addition, the metadata information may further include the historical access information of the target partition. Similarly, when the management node determines that the preset condition is met, the following condition should be further met: The historical access information of the target partition meets the target condition.

In the foregoing embodiments, during storage alteration, a display screen of the management node may be further used to display storage alteration progress. Optionally, an external display screen of the management node may be further used to display a storage status of each type of storage resource, for example, a ratio of a storage amount to a total storage resource.

In the embodiments, the management node obtains the creation duration range of the data of the target partition in the partition table; the management node further obtains the geographical area to which the target partition belongs, the historical access information of the target partition, or the service type of the target partition; and then, when the creation duration range of the data of the target partition meets the predetermined time range of the first storage stage and the preset condition is met, the management node may alter the data that is of the target partition and that has been stored based on the storage policy corresponding to the second storage stage to be stored based on the storage policy corresponding to the first storage stage. Storage performance of the first storage stage is lower than storage performance of the second storage stage. The preset condition includes one or a combination of the following three conditions: the geographical area to which the target partition belongs is the target area, the historical access information meets the target condition, and the service type of the target partition is the target service type. In this way, when the data in the partition table meets a specific condition, the data in the partition table is only stored based on a storage policy of a storage stage in which the data is located, without being deleted. Therefore, an upper-layer application can still access expired data. In addition, the management node may control the data of the partition to be stored in a storage resource that matches the data of the partition, so that data with relatively high data value is stored in a storage resource with relatively high performance, and data with relatively low data value is stored in a storage resource with relatively poor performance.

Figure 15:
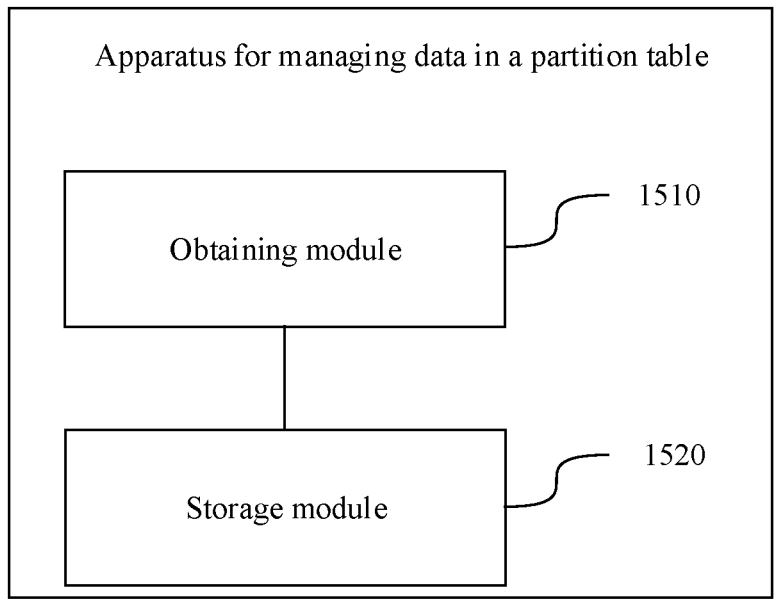
FIG. 15 is a schematic diagram of a structure of another apparatus for managing data in a partition table according to an embodiment.

FIG. 15 is a diagram of a structure of an apparatus for managing data in a partition table according to an embodiment. The apparatus may be implemented as a part of the apparatus or the entire apparatus by using software, hardware, or a combination thereof. The apparatus provided in this embodiment may implement the processes in FIG. 10 to FIG. 14 in the embodiments. The apparatus includes an obtaining module 1510 and a storage module 1520.

The obtaining module 1510 is configured to: obtain a creation duration range of data of a target partition in the partition table; and obtain a geographical area to which the target partition belongs, historical access information of the target partition, or a service type of the target partition. Specifically, the obtaining module 1510 may be configured to perform step 1001, step 1101, step 1102, step 1201, step 1202, step 1301, step 1302, step 1401, and step 1402.

The storage module 1520 is configured to: when the creation duration range of the data of the target partition meets a predetermined time range of a first storage stage and a preset condition is met, alter the data that is of the target partition and that has been stored based on a storage policy corresponding to a second storage stage to be stored based on a storage policy corresponding to the first storage stage. Specifically, the storage module 1520 may be configured to perform step 803, step 1003, step 1104, step 1204, step 1304, and step 1404.

Storage performance of the first storage stage is lower than storage performance of the second storage stage; and the preset condition includes one or a combination of the following three conditions: the geographical area to which the target partition belongs is a target area, the historical access information of the target partition meets a target condition, and the service type of the target partition is a target service type.

In a possible implementation, the historical access information includes the last access time of the target partition and/or access frequency of the target partition within first duration closest to a current time point; and the target condition is that the access frequency is less than a first value and/or second duration is greater than a second value, and the second duration is duration from the last access time to the current time point.

In a possible implementation, the storage module 1520 is configured to: when the second storage stage is a hot data storage stage and the first storage stage is a warm data storage stage, store, in a storage area corresponding to the warm data storage stage, the data of the target partition based on a storage replica number corresponding to the warm data storage stage; or when the second storage stage is a warm data storage stage and the first storage stage is a cold data storage stage, store, in a storage area corresponding to the cold data storage stage, the data of the target partition in an erasure coding EC format.

In a possible implementation, the storage module 1520 is further configured to:
    establish a mapping relationship between a Hadoop distributed file system HDFS directory of the target partition and a data block that is of the target partition and that is stored in a storage area corresponding to the first storage stage.

In this embodiment, a management node obtains the creation duration range of the data of the target partition in the partition table; the management node further obtains the geographical area to which the target partition belongs, the historical access information of the target partition, or the service type of the target partition; and then, when the creation duration range of the data of the target partition meets the predetermined time range of the first storage stage and the preset condition is met, the management node may alter the data that is of the target partition and that has been stored based on the storage policy corresponding to the second storage stage to be stored based on the storage policy corresponding to the first storage stage. The storage performance of the first storage stage is lower than the storage performance of the second storage stage. The preset condition includes one or a combination of the following three conditions: the geographical area to which the target partition belongs is the target area, the historical access information meets the target condition, and the service type of the target partition is the target service type. In this way, when the data in the partition table meets a specific condition, the data in the partition table is only stored based on a storage policy of a storage stage in which the data is located, without being deleted. Therefore, an upper-layer application can still access expired data. In addition, the management node may control the data of the partition to be stored in a storage resource that matches the data of the partition, so that data with relatively high data value is stored in a storage resource with relatively high performance, and data with relatively low data value is stored in a storage resource with relatively poor performance.

It should be noted that when the apparatus for managing data in a partition table provided by the foregoing embodiments manages the data in the partition table, the division of the foregoing functional modules is merely an example for description. In actual application, the foregoing functions can be allocated to different functional modules and implemented according to a requirement, that is, an inner structure of an apparatus is divided into different functional modules to implement all or some of the functions described above. In addition, the apparatus for managing data in a partition table provided in the foregoing embodiment belongs to a same concept as the embodiments of the method for managing data in a partition table. For a specific implementation process of the apparatus, refer to the method embodiments. Details are not described herein again.

Figure 16:
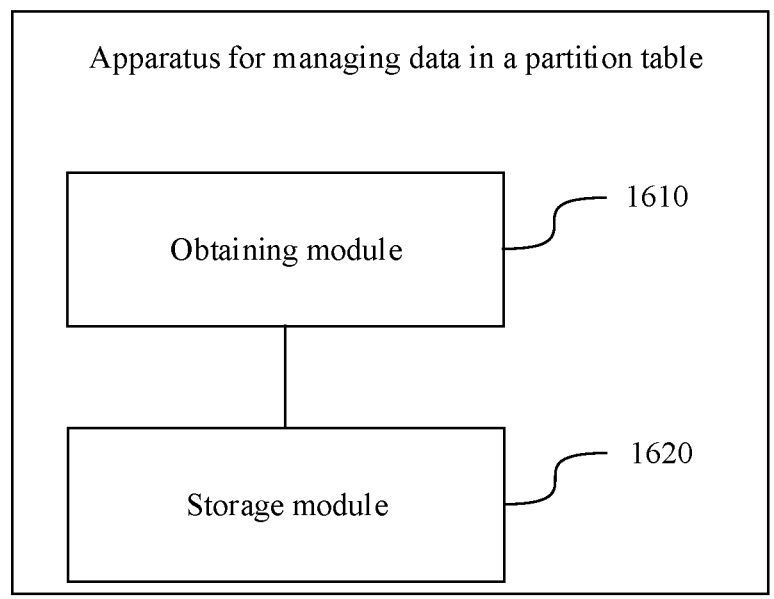
FIG. 16 is a schematic diagram of a structure of another apparatus for managing data in a partition table according to an embodiment.

FIG. 16 is a diagram of a structure of an apparatus for managing data in a partition table according to an embodiment. The apparatus may be implemented as a part of the apparatus or the entire apparatus by using software, hardware, or a combination thereof. The apparatus provided in this embodiment may implement the process in FIG. 8 in the embodiments. The apparatus includes an obtaining module 1610 and a storage module 1620.

The obtaining module 1610 is configured to obtain a creation duration range of data of a target partition in the partition table. Specifically, the obtaining module 1610 may be configured to perform step 801.

The storage module 1620 is configured to: when the creation duration range of the target partition meets a predetermined time range of a first storage stage, alter the data that is of the target partition and that has been stored based on a storage policy corresponding to a second storage stage to be stored based on a storage policy corresponding to the first storage stage. Specifically, the storage module 1620 may be configured to perform step 803.

Storage performance of the first storage stage is lower than storage performance of the second storage stage; and when the second storage stage is a hot data storage stage, the first storage stage is a warm data storage stage; or when the second storage stage is a warm data storage stage, the first storage stage is a cold data storage stage.

In a possible implementation, if minimum duration in a creation duration range of data is less than a first threshold in the hot data storage stage, minimum duration in a creation duration range of data is greater than or equal to the first threshold and the minimum duration is less than a second threshold in the warm data storage stage; or if minimum duration in a creation duration range of data is greater than or equal to the first threshold and the minimum duration is less than the second threshold in the warm data storage stage, minimum duration in a creation duration range of data is greater than or equal to the second threshold in the cold data storage stage.

In this embodiment, a management node obtains the creation duration range of the data of the target partition in the partition table; and then, when the creation duration range of the data of the target partition meets the predetermined time range of the first storage stage, the management node may alter the data that is of the target partition and that has been stored based on the storage policy corresponding to the second storage stage to be stored based on the storage policy corresponding to the first storage stage. The storage performance of the first storage stage is lower than the storage performance of the second storage stage. In this way, because only a storage manner of the data is altered and the data is not deleted, an upper-layer application can still find data stored for relatively long time.

It should be noted that when the apparatus for managing data in a partition table provided by the foregoing embodiments manages the data in the partition table, the division of the foregoing functional modules is merely an example for description. In actual application, the foregoing functions can be allocated to different functional modules and implemented according to a requirement, that is, an inner structure of an apparatus is divided into different functional modules to implement all or some of the functions described above. In addition, the apparatus for managing data in a partition table provided in the foregoing embodiment belongs to a same concept as the embodiment of the method for managing data in a partition table. For a specific implementation process of the apparatus, refer to the method embodiment. Details are not described herein again.

This disclosure further provides a management node for managing data in a partition table. The management node includes a processor and a memory. The memory stores computer instructions. The processor executes the computer instructions, to enable the management node to implement the foregoing provided method for managing data in a partition table, or enable the management node to implement the function of the foregoing apparatus for managing data in a partition table.

This disclosure further provides a management node for managing data in a partition table. The management node includes a processor and a memory. The memory stores computer instructions. The processor executes the computer instructions, to enable the management node to implement the foregoing provided method for managing data in a partition table, or enable the management node to implement the function of the foregoing apparatus for managing data in a partition table.

This disclosure further provides a computer-readable storage medium. The computer-readable storage medium stores computer instructions. The computer instructions instruct a management node to perform the foregoing method for managing data in a partition table, or the computer instructions instruct the management node to deploy the foregoing apparatus for managing data in a partition table.

This disclosure further provides a computer-readable storage medium. The computer-readable storage medium stores computer instructions. The computer instructions instruct a management node to perform the foregoing method for managing data in a partition table, or the computer instructions instruct the management node to deploy the foregoing apparatus for managing data in a partition table.

This disclosure further provides a computer program product that includes instructions. The computer instructions included in the computer program product instruct a management node to perform the foregoing method for managing data in a partition table, or the computer instructions included in the computer program product instruct the management node to deploy the foregoing apparatus for managing data in a partition table.

This disclosure further provides a computer program product that includes instructions. The computer instructions included in the computer program product instruct a management node to perform the foregoing method for managing data in a partition table, or the computer instructions included in the computer program product instruct the management node to deploy the foregoing apparatus for managing data in a partition table.

All or some of the foregoing embodiments may be implemented by using software, hardware, firmware, or any combination thereof. When the software is used for implementation, all or some of the embodiments may be implemented in a form of a computer program product. The computer program product includes one or more computer instructions. When the computer program instructions are loaded and executed on a server or a terminal, all or some of the processes or functions according to the embodiments are generated. The computer instructions may be stored in a computer-readable storage medium or may be transmitted from a computer-readable storage medium to another computer-readable storage medium. For example, the computer instructions may be transmitted from a web site, computer, server, or data center to another website, computer, server, or data center in a wired (for example, a coaxial optical cable, an optical fiber, or a digital subscriber line) or wireless (for example, infrared, radio, or microwave) manner. The computer-readable storage medium may be any usable medium accessible by a server or a terminal, or a data storage device, such as a server or a data center, integrating one or more usable media. The usable medium may be a magnetic medium (for example, a floppy disk, a hard disk, or a magnetic tape), an optical medium (for example, a digital video disk (DVD)), a semiconductor medium (for example, an SSD).

The foregoing descriptions are merely example embodiments, but are not intended to limit this disclosure. Any modification, equivalent replacement, or improvement made without departing from the spirit and principle of this disclosure should fall within the protection scope of this disclosure.

What is claimed is:

1. A method comprising:
   obtaining a creation duration range of data of a target partition in a partition table, wherein the creation duration range is a combination of a minimum duration and a maximum duration, wherein the minimum duration is a first distance between a maximum time in a creation time range and a current time point, and wherein the maximum duration is a second distance between a minimum time in the creation time range and the current time point;
   obtaining a geographical area to which the target partition belongs, historical access information of the target partition, or a service type of the target partition; and
   altering, when the creation duration range meets a predetermined time range of a first storage stage and when a preset condition is met, the data that have been stored based on a second storage policy corresponding to a second storage stage,
   wherein the second storage stage is to be stored based on a first storage policy corresponding to the first storage stage,
   wherein a first storage performance of the first storage stage is lower than a second storage performance of the second storage stage, and
   wherein the preset condition is that the geographical area is a target area, the historical access information meets a target condition, or the service type is a target service type.

2. The method of claim 1, wherein the historical access information comprises a last access time of the target partition.

3. The method of claim 1, wherein the historical access information comprises an access frequency of the target partition within a duration closest to the current time point.

4. The method of claim 3, wherein the target condition is that the access frequency is less than a first value.

5. The method of claim 1, wherein the target condition is that a duration is greater than a second value, and wherein the duration is from a last access time of the target partition to the current time point.

6. The method of claim 1, further comprising storing, when the second storage stage is a hot data storage stage, when the first storage stage is a warm data storage stage, and based on a storage replica number corresponding to the warm data storage stage, the data in a storage area corresponding to the warm data storage stage.

7. The method of claim 1, further comprising storing, when the second storage stage is a warm data storage stage and the first storage stage is a cold data storage stage, the data in a storage area corresponding to the cold data storage stage and in an erasure coding (EC) format.

8. The method according to claim 1, further comprising establishing a mapping relationship between a Hadoop distributed file system (HDFS) directory of the target partition and a data block that is of the target partition and that is stored in a storage area corresponding to the first storage stage.

9. A method comprising:
obtaining a creation duration range of data of a target partition in a partition table, wherein the creation duration range is a combination of a minimum duration and a maximum duration, wherein the minimum duration is a first distance between a maximum time in a creation time range and a current time point, and wherein the maximum duration is a second distance between a minimum time in the creation time range and the current time point; and
altering, when the creation duration range meets a predetermined time range of a first storage stage, the data that have been stored based on a second storage policy corresponding to a second storage stage,
wherein the second storage stage is to be stored based on a first storage policy corresponding to the first storage stage,
wherein a first storage performance of the first storage stage is lower than a second storage performance of the second storage stage,
wherein the first storage stage is a warm data storage stage when the second storage stage is a hot data storage stage, and
wherein the first storage stage is a cold data storage stage when the second storage stage is the warm data storage stage.

10. The method of claim 9, wherein when the minimum duration is less than a first threshold in the hot data storage stage, the minimum duration is greater than or equal to the first threshold in the warm data storage stage and less than a second threshold in the warm data storage stage.

11. The method of claim 9, wherein when the minimum duration is greater than or equal to a first threshold in the hot data storage stage and when the minimum duration is less than a second threshold in the warm data storage stage, the minimum duration is greater than or equal to the second threshold in the cold data storage stage.

12. A management node comprising:
a memory configured to store instructions; and
a processor coupled to the memory and configured to execute the instructions to cause the management node to:
obtain a creation duration range of data of a target partition in a partition table, wherein the creation duration range is a combination of a minimum duration and a maximum duration, wherein the minimum duration is a first distance between a maximum time in a creation time range and a current time point, and wherein the maximum duration is a second distance between a minimum time in the creation time range and the current time point;
obtain a geographical area to which the target partition belongs, historical access information of the target partition, or a service type of the target partition; and
alter, when the creation duration range meets a predetermined time range of a first storage stage and when a preset condition is met, the data that have been stored based on a second storage policy corresponding to a second storage stage,
wherein the second storage stage is to be stored based on a first storage policy corresponding to the first storage stage,
wherein a first storage performance of the first storage stage is lower than a second storage performance of the second storage stage, and
wherein the preset condition is that the geographical area is a target area, the historical access information meets a target condition, or the service type is a target service type.

13. The management node of claim 12, wherein the historical access information comprises a last access time of the target partition or comprises an access frequency of the target partition within a first duration closest to the current time point.

14. The management node of claim 13, wherein the target condition is that the access frequency is less than a first value or is that a duration is greater than a second value, and wherein the duration is from the last access time to the current time point.

15. The management node of claim 12, wherein the processor is further configured to execute the instructions to cause the management node to store when the second storage stage is a hot data storage stage, when the first storage stage is a warm data storage stage, and based on a storage replica number corresponding to the warm data storage stage, the data in a storage area corresponding to the warm data storage stage.

16. The management node of claim 12, wherein the processor is further configured to execute the instructions to cause the management node to store, when the second storage stage is a warm data storage stage and the first storage stage is a cold data storage stage, the data in a storage area corresponding to the cold data storage stage and in an erasure coding (EC) format.

17. The management node according to claim 12, wherein the processor is further configured to execute the instructions to cause the management node to establish a mapping relationship between a Hadoop distributed file system (HDFS) directory of the target partition and a data block that is of the target partition and that is stored in a storage area corresponding to the first storage stage.

18. A management node comprising:
a memory configured to store instructions; and
a processor coupled to the memory and configured to execute the instructions to cause the management node to:
obtain a creation duration range of data of a target partition in a partition table, wherein the creation duration range is a combination of a minimum duration and a maximum duration, wherein the minimum duration is a first distance between a maximum time in a creation time range and a current time point, and wherein the maximum duration is a second distance between a minimum time in the creation time range and the current time point; and
alter, when the creation duration range meets a predetermined time range of a first storage stage, the data that have been stored based on a second storage policy corresponding to a second storage stage,
wherein the second storage stage is to be stored based on a first storage policy corresponding to the first storage stage,
wherein a first storage performance of the first storage stage is lower than a second storage performance of the second storage stage,
wherein the first storage stage is a warm data storage stage when the second storage stage is a hot data storage stage, and
wherein the first storage stage is a cold data storage stage when the second storage stage is the warm data storage stage.

19. The management node of claim 18, wherein when the minimum duration is less than a first threshold in the hot data storage stage, the minimum duration is greater than or equal to the first threshold in the warm data storage stage and less than a second threshold in the warm data storage stage.

20. The management node of claim 18, wherein when the minimum duration is greater than or equal to a first threshold in the hot data storage stage and when the minimum duration is less than a second threshold in the warm data storage stage, the minimum duration is greater than or equal to the second threshold in the cold data storage stage.

* * * * *